(12) United States Patent
Kato et al.

(10) Patent No.: US 7,162,350 B2
(45) Date of Patent: Jan. 9, 2007

(54) VEHICLE MOTION CONTROL DEVICE

(75) Inventors: Toshihisa Kato, Handa (JP); Masanobu Fukami, Hazu-gun (JP); Tokio Yakushijin, Ikeda (JP)

(73) Assignees: Advics Co., Ltd., Kariya (JP); Daihatsu Motor Co., Ltd., Ikeda (JP)

( * ) Notice: Subject to any disclaimer, the term of this patent is extended or adjusted under 35 U.S.C. 154(b) by 233 days.

(21) Appl. No.: 10/497,228

(22) PCT Filed: Jul. 28, 2003

(86) PCT No.: PCT/JP03/09515

§ 371 (c)(1), (2), (4) Date: Jun. 1, 2004

(87) PCT Pub. No.: WO2004/024522

PCT Pub. Date: Mar. 25, 2004

(65) Prior Publication Data

US 2005/0251316 A1    Nov. 10, 2005

(30) Foreign Application Priority Data

Sep. 10, 2002 (JP) ............................. 2002-263574

(51) Int. Cl.
*B60T 8/1755* (2006.01)
(52) U.S. Cl. ........................................ 701/70; 303/146
(58) Field of Classification Search .................... None
See application file for complete search history.

(56) References Cited

U.S. PATENT DOCUMENTS 5,696,681 A * 12/1997 Hrovat et al. .................. 701/70

(Continued)

FOREIGN PATENT DOCUMENTS

JP    62-59169    3/1987

(Continued)

OTHER PUBLICATIONS

Patwardhan et al.; Theory and Experiments of Tire Blow-out Effects and Hazard Reduction Control for Automated Vehicle Lateral Control System; Proceedings of the American Control Conf., Baltimore, MD; Jun. 1994; pp. 1207-1209.*

*Primary Examiner*—Michael J. Zanelli
(74) *Attorney, Agent, or Firm*—Buchanan Ingersoll & Rooney PC

(57) ABSTRACT

A control of a vehicle motion control device 10 is as follows during an oversteer restraining control. Specifically, when tire inflation pressure is appropriate, the device sets braking force exerted on each of front and rear wheels at the outer side of the turning direction so as to be reference braking forces Ff1 and Fr1, that are generated when an absolute value of a lateral acceleration deviation ΔGy is not less than a reference value a1 and that respectively increase up to an upper limit value ff and upper limit value fr in accordance with the increase in the absolute value of the lateral acceleration deviation ΔGy. On the other hand, when a tire inflation pressure of one of the front and rear wheels at the outer side of the turning direction is lowered, the device sets the braking force, such that the braking force starts to be generated from when the absolute value of the lateral acceleration deviation ΔGy is smaller than the reference value a1 by an amount in accordance with the reduction in the tire inflation pressure and that the upper limit value of the braking force with respect to the wheel whose tire inflation pressure is lowered is decreased by an amount in accordance with the reduction in the tire inflation pressure and that the upper limit value of the braking force with respect to the wheel that is not the wheel whose tire inflation pressure is lowered is increased by an amount in accordance with the reduction in the tire inflation pressure.

5 Claims, 16 Drawing Sheets

U.S. PATENT DOCUMENTS

| | | | |
|---|---|---|---|
| 6,481,806 B1 * | 11/2002 | Krueger et al. | 303/140 |
| 6,834,218 B1 * | 12/2004 | Meyers et al. | 701/1 |
| 2005/0080546 A1 * | 4/2005 | Milot | 701/70 |

FOREIGN PATENT DOCUMENTS

| | | |
|---|---|---|
| JP | 7-257349 A | 10/1995 |
| JP | 11-5524 A | 1/1999 |
| JP | 2000-233732 A | 8/2000 |
| JP | 2000-318416 A | 11/2000 |
| JP | 2003-226235 A | 8/2003 |

* cited by examiner

VEHICLE MOTION CONTROL DEVICE

BACKGROUND OF THE INVENTION

1. Field of the Invention

The present invention relates to a vehicle motion control device for controlling a vehicle motion by controlling braking force exerted on each wheel of front wheels and rear wheels of the vehicle.

2. Description of the Prior Arts

There has conventionally been a demand for controlling a motion of a vehicle so as to prevent the turning state of the vehicle from being unstable when a tire inflation pressure of a wheel of a vehicle is lowered. Further, when the tire inflation pressure is lowered, cornering force caused on the tire is generally reduced, so that there is a tendency that the turning state of the vehicle is in an understeer state when a tire inflation pressure of a front wheel is relatively lowered than a tire inflation pressure of a rear wheel. On the other hand, there is a tendency that the vehicle is in an oversteer state when a tire inflation pressure of a rear wheel is relatively lowered than a tire inflation pressure of a front wheel.

In view of this, a vehicle motion control device disclosed in a patent document 1 described below controls a steering angle of a rear wheel in the direction for eliminating the understeer state in case where a tire inflation pressure of a front wheel is relatively lowered than a tire inflation pressure of a rear wheel, as well as controls the steering angle of the rear wheel in the direction for eliminating the oversteer state in case where a tire inflation pressure of a rear wheel is relatively lowered than a tire inflation pressure of a front wheel. This device enables the vehicle to keep a stable turning state similar to the turning state obtained when the tire inflation pressure of each wheel is an appropriate value when the vehicle is in the turning state.

Patent Document 1

Japanese Unexamined Patent Application No. SHO62-59169

Generally speaking, if the tire inflation pressure of wheels at the outer side of the turning direction is lowered when the vehicle is in the turning state, the height of the center of the rotation of the wheel from the road surface is reduced due to the increase in the amount of deformation of the tire, resulting in that an excessive roll angle is liable to occur on the vehicle body according to the reduction in the tire inflation pressure of the wheel. The above-mentioned device can eliminate the understeer state or oversteer state that occurs based upon the reduction in the tire inflation pressure as mentioned above, but it does not consider to prevent the occurrence of the excessive roll angle on the vehicle body due to the reduction in the tire inflation pressure. Accordingly, it entails a problem that there is a possibility of the occurrence of the excessive roll angle on the vehicle body when the vehicle is in the turning state and the tire inflation pressure of a wheel at the outer side of the turning direction is lowered.

SUMMARY OF THE INVENTION

The present invention aims to provide a vehicle motion control device that can surely prevent an occurrence of an excessive roll angle on a vehicle body in case where a tire inflation pressure of a wheel at the outer side of the turning direction is lowered.

A feature of the present invention is that a vehicle motion control device provided with braking force controlling means that controls braking force exerted on each wheel of the vehicle so as to ensure stability of the vehicle when the vehicle is in the turning state comprises inflation pressure obtaining means for respectively obtaining a tire inflation pressure of each wheel, wherein the braking force controlling means controls the braking force exerted on each wheel such that, when the vehicle is in the turning state and the tire inflation pressures of at least one of the wheels at the outer side of the turning direction is lower than a corresponding tire inflation pressure reduction judging reference value, a yawing moment that is exerted, as a result of the braking force being exerted on each wheel, on the vehicle in a direction opposite to the turning direction is increased compared to the case where the vehicle is in the turning state and the tire inflation pressures of all wheels at the outer side of the turning direction are not less than each of corresponding tire inflation pressure reduction judging reference values. In order to increase the yawing moment exerted on the vehicle in the direction opposite to the turning direction, a total sum of each braking force exerted on the wheels at the outer side of the turning direction may be increased, or the total sum of each braking force exerted on the wheels at the inner side of the turning direction may be decreased, for example.

The magnitude of the roll angle caused on the vehicle body depends upon a magnitude of an actual lateral acceleration that is a component of an acceleration actually exerted on the vehicle in the side-to-side direction of the vehicle body, so that it increases in response to the increase in the actual lateral acceleration. On the other hand, the magnitude of the actual lateral acceleration actually exerted on the vehicle is decreased by producing a yawing moment on the vehicle in the direction opposite to the turning direction of the vehicle or by decelerating the vehicle.

Accordingly, when the tire inflation pressures of at least one of the wheels at the outer side of the turning direction is lower than the corresponding tire inflation pressure reduction judging reference value (hereinafter referred to as "when outer-side tire inflation pressure is lowered") in case where the vehicle is in the turning state and braking force is exerted on each wheel for ensuring stability of the vehicle, a yawing moment that is exerted, as a result of the braking force being exerted on each wheel, on the vehicle in a direction opposite to the turning direction is increased compared to the case where the tire inflation pressures of all wheels at the outer side of the turning direction are not less than each of corresponding tire inflation pressure reduction judging reference values (hereinafter referred to as "when outer-side tire inflation pressure is appropriate"), whereby the actual lateral acceleration actually exerted on the vehicle is reduced when the outer-side tire inflation pressure is lowered, compared to the case when the outer-side tire inflation pressure is appropriate, thereby being capable of preventing the occurrence of the excessive roll angle on the vehicle body.

In this case, the braking force controlling means is preferably configured to increase a degree of increasing the yawing moment in the direction opposite to the turning direction according to the reduction in the tire inflation pressure of at least one wheel. As previously explained, an excessive roll angle is liable to occur on the vehicle body according to the reduction in the tire inflation pressure of the wheel at the outer side of the turning direction. Accordingly, the above-mentioned configuration allows to appropriately set a degree of preventing the increase in the roll angle, according to a degree of increase of the tendency that an excessive roll angle occurs, based upon the reduction in the tire inflation pressure, thereby being capable of preventing the occurrence of an excessive roll angle on the vehicle body while satisfactorily keeping stability of the vehicle.

Moreover, in the vehicle motion control device, the braking force controlling means is preferably configured to increase the total sum of each braking force exerted on the wheels at the outer side of the turning direction in order to increase the yawing moment in the direction opposite to the turning direction. This configuration allows to increase the total sum of the braking force exerted on each wheel when the outer-side tire inflation pressure is lowered, compared to the case when the outer-side tire inflation pressure is appropriate, resulting in that the decelerating force for decelerating the vehicle is also increased. Therefore, when outer-side tire inflation pressure is lowered, the occurrence of an excessive roll angle on the vehicle body can further be prevented by both an effect for reducing the actual lateral acceleration actually exerted on the vehicle due to the action of the yawing moment in the direction opposite to the turning direction and an effect for reducing the actual lateral acceleration due to the action of the decelerating force.

In case where the braking force controlling means is preferably configured to increase the total sum of each braking force exerted on the wheels at the outer side of the turning direction in order to increase the yawing moment in the direction opposite to the turning direction as described above, the braking force controlling means is preferably configured to respectively set an upper limit value of the braking force exerted on each wheel and to decrease the upper limit value of the braking force exerted on the at least one wheel according to the reduction in the tire inflation pressure of the above-mentioned at least one wheel.

In this case, in order to increase the total sum of each braking force exerted on the wheels at the outer side of the turning direction when outer-side tire inflation pressure is lowered compared to the case when outer-side tire inflation pressure is appropriate, the braking force (its upper limit value) exerted on the wheels at the outer side of the turning direction, other than at least one wheel (hereinafter referred to as "a wheel whose tire inflation pressure is lowered") whose tire inflation pressure is lower than the corresponding tire inflation pressure reduction judging reference value, is set so as to be greater than that of when outer-side tire inflation pressure is appropriate.

When excessive braking force is applied on the wheel whose tire inflation pressure is lowered, the tire of the wheel is deformed, so that the height of the center of the rotation of the wheel from the road surface is decreased to thereby increase the tendency that an excessive roll angle occurs on the vehicle body. On the other hand, the braking force exerted on the wheel whose tire inflation pressure is lowered is controlled so as not to exceed the upper limit value that is decreased according to the reduction in the tire inflation pressure of the wheel as described above, whereby a degree of the deformation of the tire of the wheel whose tire inflation pressure is lowered can be kept small, and hence, the occurrence of an excessive roll angle on the vehicle body can much further be prevented by both the effect for reducing the actual lateral acceleration actually exerted on the vehicle due to the action of the yawing moment in the direction opposite to the turning direction and the effect for reducing the actual lateral acceleration due to the action of the decelerating force.

Moreover, in the above-mentioned vehicle motion control device, the braking force controlling means is preferably configured to start to exert on each wheel of the vehicle braking force for ensuring stability of the vehicle when the vehicle is in the turning state and a degree of deteriorating the stability of the vehicle exceeds a predetermined degree, as well as to decrease the predetermined degree according to the reduction in the tire inflation pressure of the at least one wheel.

When the vehicle is in the turning state and during a process wherein the deterioration of the stability of the vehicle advances, this configuration enables to start to exert braking force on each wheel for producing a yawing moment in the direction opposite to the turning direction at an earlier stage according to the reduction in the tire inflation pressure of the wheel whose tire inflation pressure is lowered when outer-side tire inflation pressure is lowered, compared to the case when outer-side tire inflation pressure is appropriate. Accordingly, when outer-side tire inflation pressure is lowered, the yawing moment in the direction opposite to the turning direction can smoothly be increased according to the reduction in the tire inflation pressure of the wheel whose tire inflation pressure is lowered, compared to the case when outer-side tire inflation pressure is appropriate.

BRIEF DESCRIPTION OF THE DRAWINGS

FIG. 4 is a flowchart showing a routine executed by the CPU shown in FIG. 1 for calculating a wheel speed or the like;

DESCRIPTION OF THE PREFERRED EMBODIMENT

Figure 1:
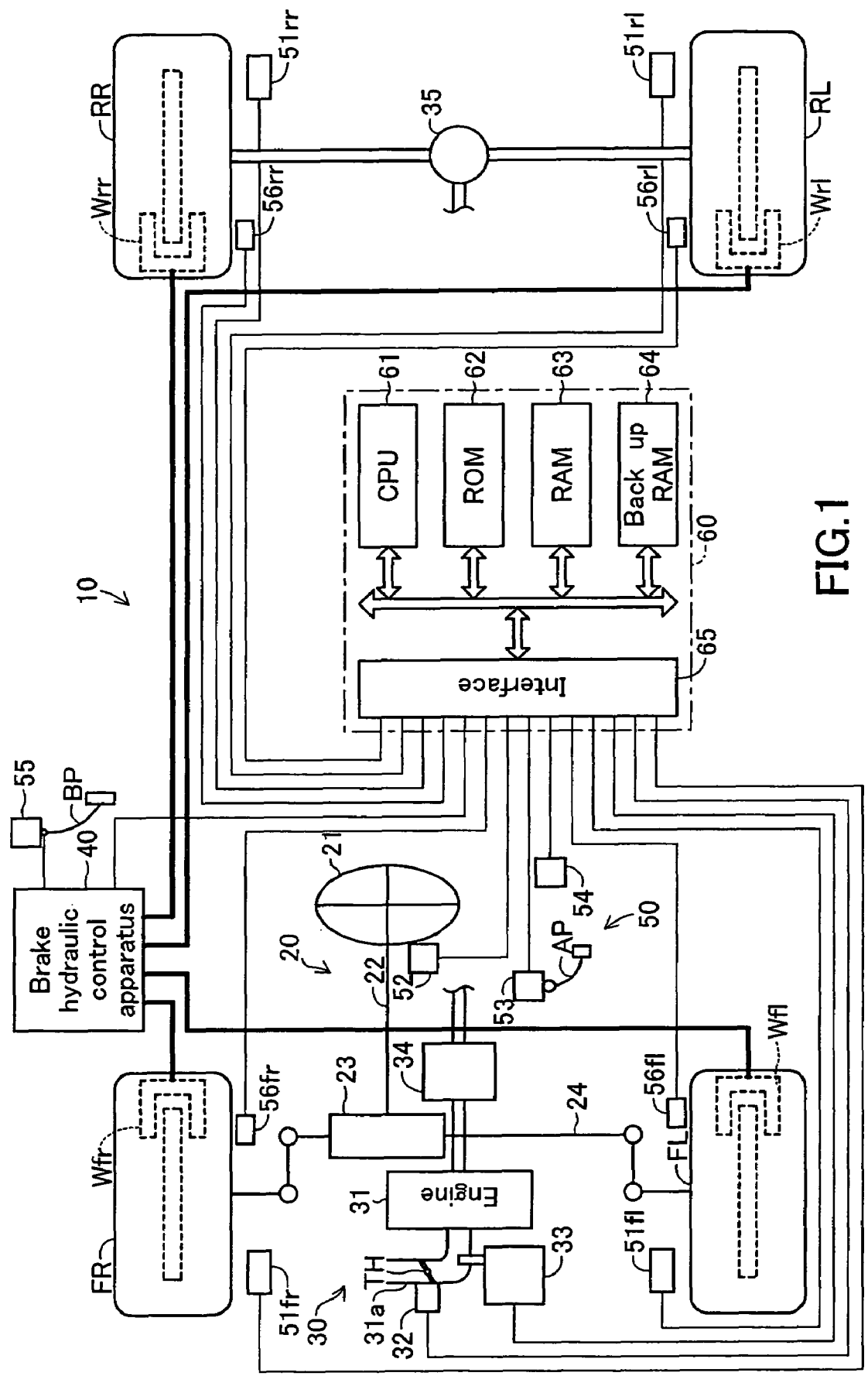
FIG. 1 is a schematic constructional view of a vehicle having mounted thereto a vehicle motion control device according to an embodiment of the present invention.

A preferred embodiment of a vehicle motion control device according to the present invention will be explained hereinbelow with reference to drawings. FIG. 1 shows a schematic construction of a vehicle provided with a vehicle motion control device 10 according to the embodiment of the invention. This vehicle is a four-wheel drive vehicle using a rear-wheel drive system and having two front wheels (front-left wheel FL and front-right wheel FR) that are steering wheels as well as non-driving wheels and two rear wheels (rear-left wheel RL and rear-right wheel RR) that are driving wheels.

The vehicle motion control device 10 is configured to include a front-wheel steering mechanism 20 for steering the steering wheels FL and FR, a driving force transmission section 30 that produces driving force and respectively transmits this driving force to each driving wheel RL and RR, a brake hydraulic control apparatus 40 for producing braking force by a brake fluid pressure on each wheel, a sensor section 50 composed of various sensors and an electrical control apparatus 60.

The front-wheel steering mechanism 20 is composed of a steering 21, column 22 integrally pivotable with the steering 21, steering actuator 23 linked to the column 22 and a link mechanism 24 including a tie rod that is moved in the side-to-side direction of the vehicle body by the steering actuator 23 and a link that can steer the steering wheels FL and FR by the movement of the tie rod. By this configuration, rotating the steering 21 from its center position (reference position) changes the steering angles of the steering wheels FL and FR from the reference angle at which the vehicle runs straight.

The steering actuator 23 is composed to include a so-called known hydraulic power steering device that generates assisting force for moving the tie rod according to the rotational torque of the column 22, thereby shifting the tie rod from the neutral position to the side-to-side direction of the vehicle by the assisting force in proportion to the steering angle θs from the neutral position of the steering 21. The configuration and operation of the steering actuator 23 are well known, so that the detailed explanation thereof is omitted here.

The driving force transmission section 30 is configured to include an engine 31 that produces driving force, a throttle valve actuator 32 arranged in an inlet pipe 31a of the engine 31 and having a DC motor for controlling an opening TA of a throttle valve TH that can modulate the cross-sectional area of the inlet path, a fuel injection device 33 including an injector that injects fuel to the vicinity of an inlet port not shown of the engine 31, a transmission 34 connected to the output shaft of the engine 31 and a differential gear 36 that suitably distributes and transmits the driving force transmitted from the transmission 34 to rear wheels RR and RL.

Figure 2:
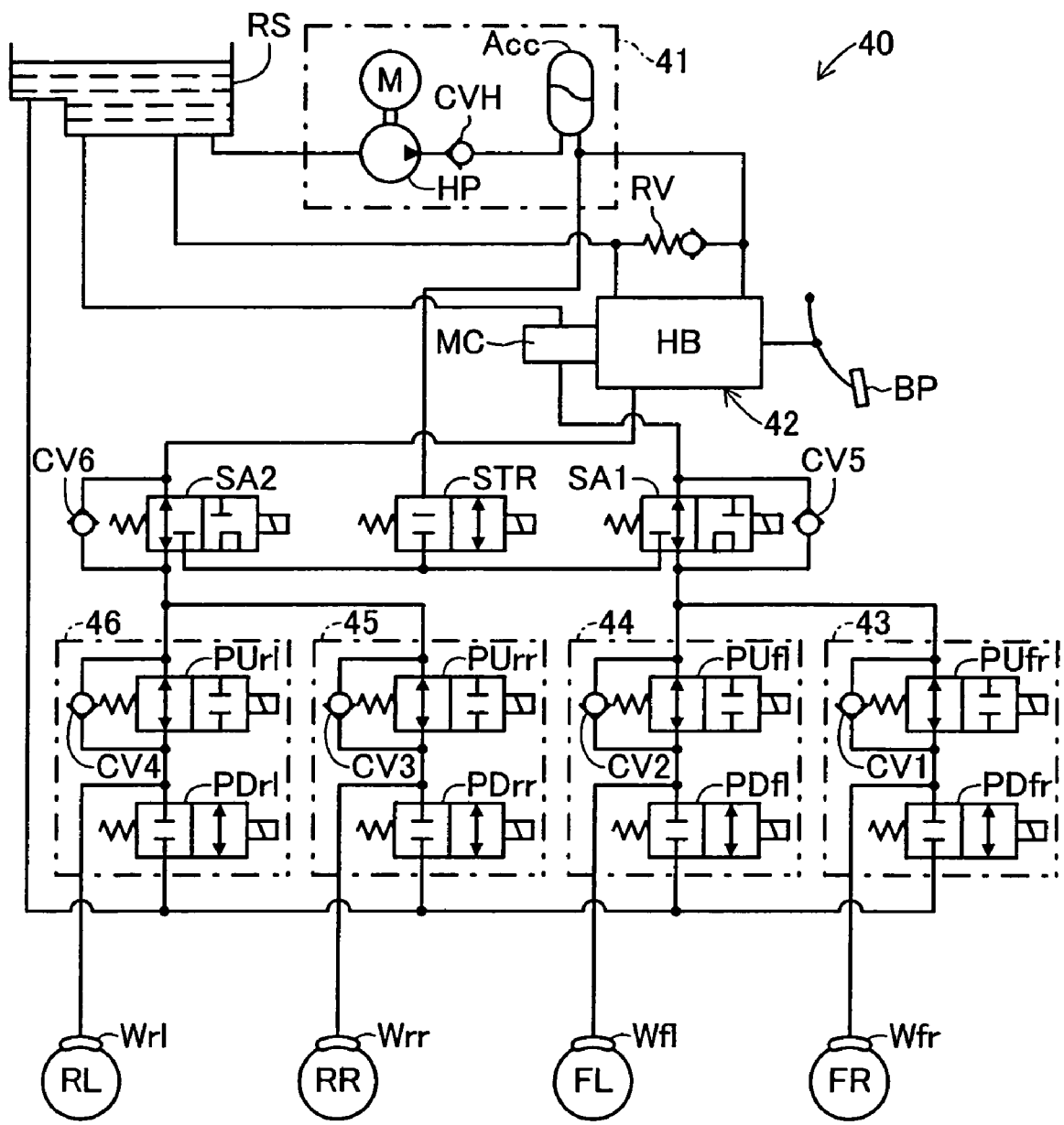
FIG. 2 is a schematic constructional view of a brake hydraulic control device shown in FIG. 1.

The brake hydraulic control apparatus 40 whose construction is schematically shown in FIG. 2 is configured to include a high-pressure generating section 41, a brake fluid pressure generating section 42 that generates brake fluid pressure according to operating force on a brake pedal BP, and an FR brake fluid pressure adjusting section 43, an FL brake fluid pressure adjusting section 44, an RR brake fluid pressure adjusting section 45 and an RL brake fluid pressure adjusting section 46 that are capable of adjusting brake fluid pressure supplied respectively to wheel cylinders Wfr, Wfl, Wrr and Wrl each arranged at each wheel FR, FL, RR and RL.

The high-pressure generating section 41 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 41.

The brake hydraulic generating section 42 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 41 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 43 and the upstream side of the FL brake fluid pressure adjusting section 44. Similarly, a control valve SA2 that is a three-port two-position switching type solenoid-operated valve is arranged between the hydraulic booster HB and each of the upstream side of the RR brake fluid pressure adjusting section 45 and the upstream side of the RL brake fluid pressure adjusting section 46. Further, a change-over valve STR that is a two-port two-position switching type, normally closed, solenoid-operated on-off valve is arranged between the high-pressure generating section 41 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 43 and the upstream section of the FL brake fluid pressure adjusting section 44. When in the second position (in the actuated position), it functions to cut off the communication between the master cylinder MC and each of the upstream section of the FR brake fluid pressure adjusting section 43 and the upstream section of the FL brake fluid pressure adjusting section 44, but to establish the communication between the change-over valve STR and each of the upstream section of the FR brake fluid pressure adjusting section 43 and the upstream section of the FL brake fluid pressure adjusting section 44.

When the control valve SA2 is in the first position in FIG. 2 (in the non-actuated position), it functions to establish communication between the hydraulic booster HB and each of the upstream section of the RR brake fluid pressure adjusting section 45 and the upstream section of the RL brake fluid pressure adjusting section 46. When in the second position (in the actuated position), it functions to cut off the communication between the hydraulic booster HB and each of the upstream section of the RR brake fluid pressure adjusting section 45 and the upstream section of the RL brake fluid pressure adjusting section 46, but to establish the communication between the change-over valve STR and each of the upstream section of the RR brake fluid pressure adjusting section 45 and the upstream section of the RL brake fluid pressure adjusting section 46.

By this operation, master cylinder fluid pressure is supplied to each of the upstream section of the FR brake fluid pressure adjusting section 43 and the upstream section of the FL brake fluid pressure adjusting section 44 when the control valve SA1 is placed at the first position, while high pressure generated from the high-pressure generating section 41 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 45 and the upstream section of the RL brake fluid pressure adjusting section 46 when the control valve SA2 is placed at the first position, while high pressure generated from the high-pressure generating section 41 is supplied thereto when the control valve SA2 is placed at the second position and the change-over valve STR is placed at the second position.

The FR brake fluid pressure adjusting section 43 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 43 and the wheel cylinder Wfr, while it cuts off the communication between the upstream section of the FR brake fluid pressure adjusting section 43 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 43 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 43. When the pressure increasing valve PUfr and the pressure reducing valve PDfr are placed at the second position, the brake fluid in the wheel cylinder Wfr is returned to the reservoir RS to thereby reduce the fluid pressure.

A check valve CV1 is arranged in parallel to the pressure increasing valve PUfr for allowing only one-way flow of the brake fluid from the wheel cylinder Wfr side to the upstream section of the FR brake fluid pressure adjusting section 43. This arrangement brings a rapid reduction of the brake fluid pressure in the wheel cylinder Wfr when the released brake pedal BP is opened with the control valve SA1 placed at the first position.

Similarly, the FL brake fluid pressure adjusting section 44, RR brake fluid pressure adjusting section 45 and RL brake fluid pressure adjusting section 46 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 43 and the FL brake fluid pressure adjusting section 44 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

By the construction described above, the brake hydraulic control apparatus 40 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUfr and pressure reducing valve PDfr respectively, the brake hydraulic control apparatus 40 can increase only the brake fluid pressure in the wheel cylinder Wfr by a predetermined value by utilizing the high pressure generated from the high-pressure generating section 41 while the brake fluid pressure in the wheel cylinder Wfl is maintained under a state where the brake pedal BP is not operated (is released). As described above, the brake hydraulic control apparatus 40 independently controls the brake fluid pressure in the wheel cylinder of each wheel regardless of the operation on the brake pedal BP, thereby being capable of exerting predetermined braking force on every independent wheel.

Referring again to FIG. 1, the sensor section 50 is composed of wheel speed sensors 51*fl*, 51*fr*, 51*rl* and 51*rr* each constructed by a rotary encoder that outputs a signal having a pulse every time each wheel FL, FR, RL and RR rotates at a predetermined angle, a steering angle sensor 52 for detecting the angle of rotation from the neutral position of the steering 21 to output a signal showing a steering angle θs, an accelerator opening sensor 53 that detects an operating amount of an accelerator pedal AP operated by a driver and outputs a signal showing the operating amount Accp of the accelerator pedal AP, a lateral acceleration sensor 54 that detects a lateral acceleration which is a component in the side-to-side direction of a vehicle body of the acceleration actually exerted on the vehicle and outputs a signal showing the lateral acceleration Gy (m/s$^2$), a brake switch 55 that detects whether the brake pedal BP is operated or not by the driver for outputting a signal showing that the braking operation is performed or not and tire inflation pressure sensors 56*fl*, 56*fr*, 56*rl* and 56*rr*, as inflation pressure obtaining means, each detecting a tire inflation pressure of each wheel FL, FR, RL and RR for outputting each signal showing each tire inflation pressure Pfl, Pfr, Prl and Prr.

The steering angle θs is set to be "0" when the steering 21 is positioned at the neutral position, set to a positive value when the steering 21 is rotated in the counterclockwise direction (seen by a driver) from the neutral position, and set to a negative value when the steering 21 is rotated in the clockwise direction from the neutral position. Further, the lateral acceleration Gy is set to be a positive value when the vehicle is turning in the leftward direction, while set to be a negative value when the vehicle is turning in the rightward direction.

The electrical control apparatus 60 is a microcomputer including a CPU 61, a ROM 62 that stores in advance a routine (program) executed by the CPU 61, table (look-up table, map), constant or the like, a RAM 63 to which the CPU 61 temporarily stores data as needed, a back-up RAM 64 that stores data with a power supply turned on and holds the stored data even during a period when the power supply is turned off and an interface 65 including an AD converter, those of which are connected to one another with a bus. The interface 65 is connected to the sensors 51 to 55, thereby supplying to the CPU 61 signals from the sensors 51 to 55 and transmitting a driving signal to each solenoid-operated valve and motor M of the brake hydraulic control apparatus 40, the throttle valve actuator 32 and the fuel injection device 33 according to the instruction from the CPU 61.

By this operation, the throttle valve actuator 32 drives the throttle valve TH such that the opening thereof becomes an opening according to the operating amount Accp of the accelerator pedal AP, and the fuel injection device 33 injects fuel in a required amount so as to obtain a predetermined target air-fuel ratio (theoretical air-fuel ratio) concerning intake air mass according to the opening of the throttle valve TH.

[Outline of Vehicle Motion Control]

The vehicle motion control device 10 calculates the target lateral acceleration Gyt (m/s$^2$) based upon a following formula (1) that is a theoretical formula as a predetermined rule directed from a vehicle motion model. The target lateral acceleration Gyt is set to the positive value when the vehicle turns in the leftward direction (when the steering angle θs (deg) is a positive value), while it is set to the negative value when the vehicle turns in the rightward direction (when the steering angle θs is a negative value). This theoretical formula is a formula for calculating a theoretical value of the lateral acceleration exerted on the vehicle when the vehicle turns with the steering angle and vehicle body speed constant (upon the normal circular turn).

$$Gyt = (Vso^2 \cdot \theta s)/(n \cdot l) \cdot (1/(1 + Kh \cdot Vso^2)) \qquad (1)$$

In the above formula (1), Vso is a calculated estimated body speed (m/s) as described later. Further, n is a gear ratio (constant value) that is a ratio of a change amount of a rotation angle of the steering 21 to a change amount of a turning angle of the steering wheels FL and FR, l is a wheel base (m) of the vehicle that is a constant value determined by the vehicle body, and Kh is a stability factor ($s^2/m^2$) that is a constant value determined by the vehicle body.

Further, this device also calculates a lateral acceleration deviation $\Delta Gy$ (m/s$^2$), based upon the formula (2) described later, that is a deviation between the absolute value of the target lateral acceleration Gyt calculated as described above and the absolute value of the detected actual lateral acceleration Gy obtained by the lateral acceleration sensor 54.

$$\Delta Gy = |Gyt| - |Gy| \qquad (2)$$

[Understeer Restraining Control]

When the value of the lateral acceleration deviation $\Delta Gy$ is not less than the positive predetermined value, the vehicle is in a state where the turning radius is greater than the turning radius of when the target lateral acceleration Gyt is assumed to be caused on the vehicle (hereinafter referred to as "understeer state"), whereby this device judges that the turning state of the vehicle is the understeer state and executes an understeer restraining control (hereinafter referred to as "US restraining control") for restraining the understeer state.

Specifically, this device exerts predetermined braking force according to the value of the lateral acceleration deviation $\Delta Gy$ on only the rear wheel at the inner side of the turning direction, thereby forcibly producing a yawing moment on the vehicle in the direction same as the turning direction. This allows to increase the absolute value of the actual lateral acceleration Gy, so that the actual lateral acceleration Gy is controlled to be close to the target lateral acceleration Gyt. It is to be noted that the magnitude of the predetermined braking force forcibly produced under the US restraining control does not depend upon whether the tire inflation pressure of the wheels at the outer side of the turning direction is lowered or not.

[Oversteer Restraining Control]

On the other hand, when the value of the lateral acceleration deviation $\Delta Gy$ is a negative value and its absolute value (the degree of deterioration of the stability of the vehicle) is not less than a predetermined value (predetermined degree, control starting value under OS restraining control), the vehicle is in a state where the turning radius is smaller than the turning radius of when the target lateral acceleration Gyt is assumed to be caused on the vehicle (hereinafter referred to as "oversteer state"), whereby this device judges that the turning state of the vehicle is the oversteer state and executes an oversteer restraining control (hereinafter referred to as "OS restraining control") for restraining the overseer state.

Figure 3:
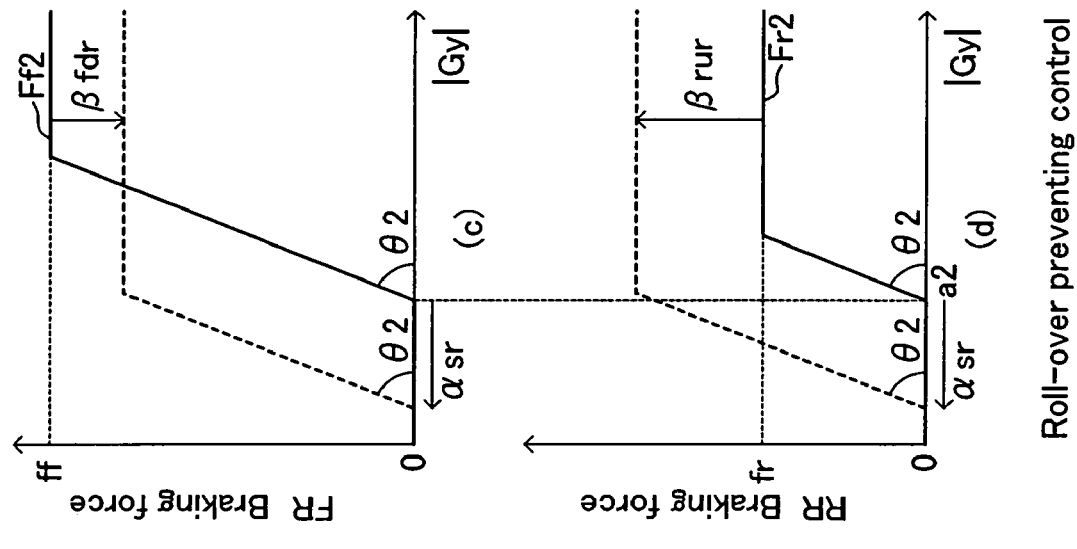
FIGS. 3(a) and (b) are views showing one example of braking force exerted on each wheel of the vehicle that is turning in the leftward direction under an OS restraining control, while FIGS. 3(c) and (d) are views showing one example of braking force exerted on each wheel of the vehicle that is turning in the leftward direction under a roll-over preventing control.
Figure 3:
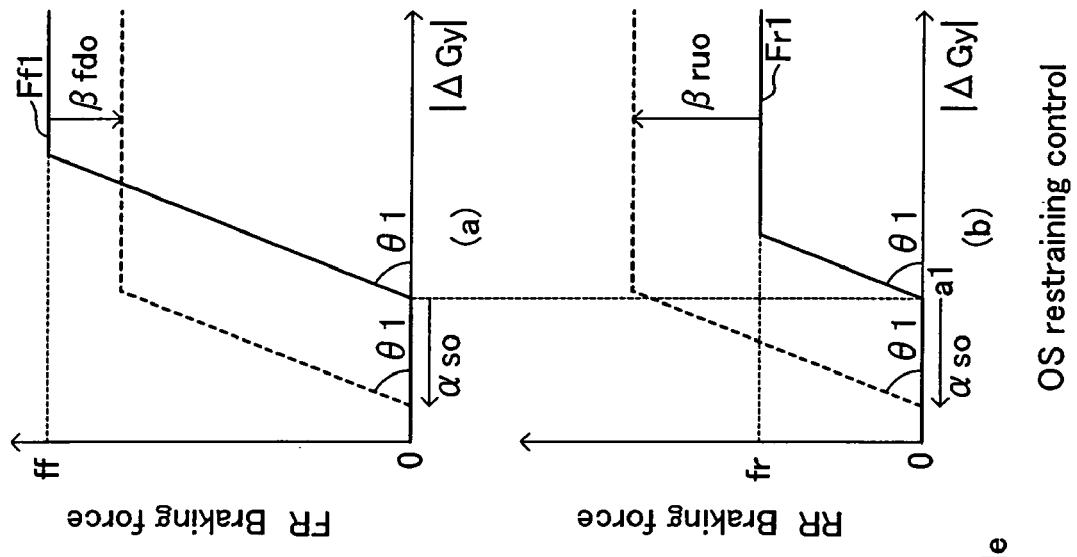
Figure 3:
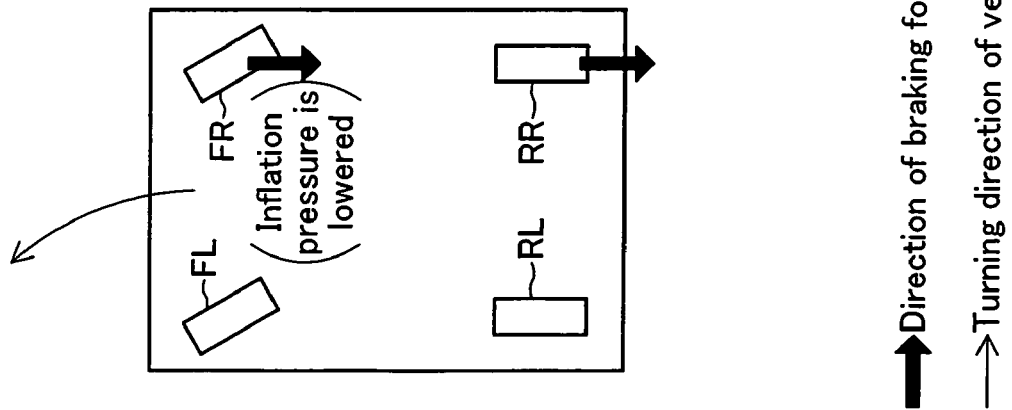

Specifically, as shown in FIGS. 3(*a*) and (*b*) showing one example of braking force exerted on each wheel of the vehicle that is turning in the leftward direction under the OS restraining control, this device exerts predetermined braking force according to the absolute value of the lateral acceleration deviation $\Delta Gy$ on the front and rear wheels at the outer side of the turning direction, thereby forcibly producing a yawing moment on the vehicle in the direction opposite to the turning direction. This allows to decrease the absolute value of the actual lateral acceleration Gy, so that the actual lateral acceleration Gy is controlled to be close to the target lateral acceleration Gyt. It is to be noted that the magnitude of the predetermined braking force forcibly produced under the OS restraining control depends upon whether the tire inflation pressure of the wheels at the outer side of the turning direction is lowered or not as explained below.

Firstly, the explanation is made about the case (the case where the outer-side tire inflation pressure is appropriate) where the tire inflation pressure Pof (=Pfr) of the front wheel (the wheel FR in FIG. 3) at the outer side of the turning direction is not less than a front-wheel-side tire inflation pressure reduction judging reference value Pfref (constant value) and the tire inflation pressure Por (=Prr) of the rear wheel (the wheel RR in FIG. 3) at the outer side of the turning direction is not less than a rear-wheel-side tire inflation pressure reduction judging reference value Prref (constant value). The braking force exerted on the front wheel at the outer side of the turning direction (the wheel FR in FIG. 3) is set so as to be a front-wheel-side reference braking force under OS restraining control Ff1 indicated by a solid line in FIG. 3(*a*). This front-wheel-side reference braking force under OS restraining control Ff1 becomes "0" when the absolute value of the lateral acceleration deviation $\Delta Gy$ is not more than the control starting reference value under OS restraining control a1, while, when the absolute value of the lateral acceleration deviation $\Delta Gy$ exceeds the value a1, it increases from "0" with a predetermined slope $\theta 1$ until it reaches a front-wheel-side reference upper limit value ff, as the absolute value of the lateral acceleration deviation $\Delta Gy$ increases from the value a1. After the front-wheel-side reference braking force under OS restraining control Ff1 reaches the front-wheel-side reference upper limit value if, it is set so as to keep the front-wheel-side reference upper limit value ff even if the absolute value of the lateral acceleration deviation $\Delta Gy$ increases.

Further, the braking force exerted on the rear wheel at the outer side of the turning direction (the wheel RR in FIG. 3) is set so as to be a rear-wheel-side reference braking force under OS restraining control Fr1 indicated by a solid line in FIG. 3(*b*). This rear-wheel-side reference braking force under OS restraining control Fr1 becomes "0" when the absolute value of the lateral acceleration deviation $\Delta Gy$ is not more than the control starting reference value under OS restraining control a1, while, when the absolute value of the lateral acceleration deviation $\Delta Gy$ exceeds the value a1, it increases from "0" with a predetermined slope $\theta 1$ until it reaches a rear-wheel-side reference upper limit value fr (<front-wheel-side reference upper limit value ff), as the absolute value of the lateral acceleration deviation $\Delta Gy$ increases from the value a1. After the rear-wheel-side reference braking force under OS restraining control Fr1 reaches the rear-wheel-side reference upper limit value fr, it is set so as to keep the rear-wheel-side reference upper limit value fr even if the absolute value of the lateral acceleration deviation $\Delta Gy$ increases.

Subsequently, the explanation is made about the case (the case where outer-side tire inflation pressure is lowered) where the tire inflation pressure Pof (=Pfr) of the front wheel at the outer side of the turning direction (the wheel FR in FIG. 3) is less than the front-wheel-side tire inflation pressure reduction judging reference value Pfref (constant value). The braking force exerted on the front wheel at the outer side of the turning direction (the wheel FR in FIG. 3) is set such that, compared to the front-wheel-side reference braking force under OS restraining control Ff1, a control starting value under OS restraining control with respect to the absolute value of the lateral acceleration deviation $\Delta Gy$ is set to be smaller than the control starting reference value under OS restraining control a1 by an early control starting volume under OS restraining control $\alpha$so that is determined so as to increase according to the decreasing amount of the tire inflation pressure Pof of the front wheel at the outer side of the turning direction from the front-wheel-side tire inflation pressure reduction judging reference value Pfref, and the upper limit value is set so as to be smaller than the front-wheel-side reference upper limit value ff by a front-wheel-side limiting volume under OS restraining control βfdo that is determined so as to increases according to the decreasing amount of the tire inflation pressure Pof of the front wheel at the outer side of the turning direction from the front-wheel-side tire inflation pressure reduction judging reference value Pfref, as indicated by a broken line in FIG. 3(a).

Further, the braking force exerted on the rear wheel at the outer side of the turning direction (the wheel RR in FIG. 3) is set such that, compared to the rear-wheel-side reference braking force under OS restraining control Fr1, a control starting value under OS restraining control with respect to the absolute value of the lateral acceleration deviation ΔGy is set to be smaller than the control starting reference value under OS restraining control a1 by the early control starting volume under OS restraining control αso, and the upper limit value is set so as to be greater than the rear-wheel-side reference upper limit value fr by a rear-wheel-side replenishment volume under OS restraining control βruo that is determined so as to increases according to the decreasing amount of the tire inflation pressure Pof of the front wheel at the outer side of the turning direction from the front-wheel-side tire inflation pressure reduction judging reference value Pfref, as indicated by a broken line in FIG. 3(b). The rear-wheel-side replenishment volume under OS restraining control βruo is set here so as to be always greater than the front-wheel-side limiting volume under OS restraining control βfdo regardless of the decreasing amount of the tire inflation pressure Pof of the front wheel at the outer side of the turning direction from the front-wheel-side tire inflation pressure reduction judging reference value Pfref.

On the other hand, the explanation is made about the case (the case where outer-side tire inflation pressure is lowered) where the tire inflation pressure Por of the rear wheel at the outer side of the turning direction is less than the rear-wheel-side tire inflation pressure reduction judging reference value Prref. The braking force exerted on the front wheel at the outer side of the turning direction is set such that, compared to the front-wheel-side reference braking force under OS restraining control Ff1, a control starting value under OS restraining control with respect to the absolute value of the lateral acceleration deviation ΔGy is set to be smaller than the control starting reference value under OS restraining control a1 by an early control starting volume under OS restraining control αso that is determined so as to increase according to the decreasing amount of the tire inflation pressure Por of the rear wheel at the outer side of the turning direction from the rear-wheel-side tire inflation pressure reduction judging reference value Prref, and the upper limit value is set so as to be greater than the front-wheel-side reference upper limit value ff by a front-wheel-side replenishment volume under OS restraining control βfuo that is determined so as to increases according to the decreasing amount of the tire inflation pressure Por of the rear wheel at the outer side of the turning direction from the rear-wheel-side tire inflation pressure reduction judging reference value Prref.

Further, the braking force exerted on the rear wheel at the outer side of the turning direction is set such that, compared to the rear-wheel-side reference braking force under OS restraining control Fr1, a control starting value under OS restraining control with respect to the absolute value of the lateral acceleration deviation ΔGy is set to be smaller than the control starting reference value under OS restraining control a1 by the early control starting volume under OS restraining control αso, and the upper limit value is set so as to be smaller than the rear-wheel-side reference upper limit value fr by a rear-wheel-side limiting volume under OS restraining control βrdo that is determined so as to increases according to the decreasing amount of the tire inflation pressure Por of the rear wheel at the outer side of the turning direction from the rear-wheel-side tire inflation pressure reduction judging reference value Prref. The front-wheel-side replenishment volume under OS restraining control βfuo is set here so as to be always greater than the rear-wheel-side limiting volume under OS restraining control βrdo regardless of the decreasing amount of the tire inflation pressure Por of the rear wheel at the outer side of the turning direction from the rear-wheel-side tire inflation pressure reduction judging reference value Prref.

As described above, when outer-side tire inflation pressure is lowered, the total sum (the sum of the FR braking force and the RR braking force in FIG. 3) exerted on the wheels at the outer side of the turning direction is set so as to be greater than that of when outer-side tire inflation pressure is appropriate, according to the decrease in the tire inflation pressure of the wheel whose tire inflation pressure is lowered, and the upper limit value of the braking force exerted on the tire of the wheel whose tire inflation pressure is lowered is set so as to be decreased according to the decrease in the tire inflation pressure of the wheel whose tire inflation pressure is lowered, and further, the degree of the deterioration of the stability of the vehicle (predetermined degree, absolute value of the lateral acceleration deviation ΔGy, the control starting value under OS restraining control) at the time of starting the OS restraining control is set so as to be decreased according to the decrease in the tire inflation pressure of the wheel whose tire inflation pressure is decreased.

[Roll-over Preventing Control]

Moreover, when the absolute value (the degree of the deterioration of stability of the vehicle) of the actual lateral acceleration Gy obtained from the lateral acceleration sensor 54 is not less than a predetermined value (predetermined degree, control starting value under roll-over preventing control), this device executes a roll-over preventing control for decreasing a roll angle generated according to the absolute value of the actual lateral acceleration Gy.

Specifically, as shown in FIGS. 3(c) and (d) showing one example of braking force exerted on each wheel of the vehicle that is turning in the leftward direction under the roll-over preventing control, this device exerts predetermined braking force according to the absolute value of the lateral acceleration Gy on the front and rear wheels at the outer side of the turning direction, thereby forcibly producing a yawing moment on the vehicle in the direction opposite to the turning direction. This allows to decrease the absolute value of the actual lateral acceleration Gy, so that the roll angle generated on the vehicle is controlled to be decreased. It is to be noted that the magnitude of the predetermined braking force forcibly produced under the roll-over preventing control also depends upon whether the tire inflation pressure of the wheels at the outer side of the turning direction is lowered or not like the case of the OS restraining control.

Firstly, the explanation is made about the case where outer-side tire inflation pressure is appropriate. The braking force exerted on the front wheel at the outer side of the turning direction (the wheel FR in FIG. 3) is set so as to be a front-wheel-side reference braking force under roll-over preventing control Ff2 indicated by a solid line in FIG. 3(c), like the front-wheel-side reference braking force under OS restraining control Ff1 indicated by the solid line in FIG. 3(a) previously explained.

Further, the braking force exerted on the rear wheel at the outer side of the turning direction (the wheel RR in FIG. 3) is set so as to be a rear-wheel-side reference braking force under roll-over preventing control Fr2 indicated by a solid line in FIG. 3(d), like the rear-wheel-side reference braking force under OS restraining control Fr1 indicated by the solid line in FIG. 3(b) previously explained.

Subsequently, the explanation is made about the case (the case where outer-side tire inflation pressure is lowered) where the tire inflation pressure Pof (=Pfr) of the front wheel at the outer side of the turning direction (the wheel FR in FIG. 3) is less than the front-wheel-side tire inflation pressure reduction judging reference value Pfref (constant value). The braking force exerted on the front wheel at the outer side of the turning direction (the wheel FR in FIG. 3) is set such that, compared to the front-wheel-side reference braking force under roll-over preventing control Ff2, a control starting value under roll-over preventing control with respect to the absolute value of the lateral acceleration Gy is set to be smaller than a control starting reference value under roll-over preventing control a2 by an early control starting volume under roll-over preventing control αsr that is determined so as to increase according to the decreasing amount of the tire inflation pressure Pof of the front wheel at the outer side of the turning direction from the front-wheel-side tire inflation pressure reduction judging reference value Pfref, and the upper limit value is set so as to be smaller than the front-wheel-side reference upper limit value ff by a front-wheel-side limiting volume under roll-over preventing control βfdr that is determined so as to increases according to the decreasing amount of the tire inflation pressure Pof of the front wheel at the outer side of the turning direction from the front-wheel-side tire inflation pressure reduction judging reference value Pfref, as indicated by a broken line in FIG. 3(c).

Further, the braking force exerted on the rear wheel at the outer side of the turning direction (the wheel RR in FIG. 3) is set such that, compared to the rear-wheel-side reference braking force under roll-over preventing control Fr2, a control starting value under roll-over preventing control with respect to the absolute value of the lateral acceleration Gy is set to be smaller than the control starting reference value under roll-over preventing control a2 by the early control starting volume under roll-over preventing control αsr, and the upper limit value is set so as to be greater than the rear-wheel-side reference upper limit value fr by a rear-wheel-side replenishment volume under roll-over preventing control βrur that is determined so as to increases according to the decreasing amount of the tire inflation pressure Pof of the front wheel at the outer side of the turning direction from the front-wheel-side tire inflation pressure reduction judging reference value Pfref, as indicated by a broken line in FIG. 3(d). The rear-wheel-side replenishment volume under roll-over preventing control βrur is set here so as to be always greater than the front-wheel-side limiting volume under roll-over preventing control βfdr regardless of the decreasing amount of the tire inflation pressure Pof of the front wheel at the outer side of the turning direction from the front-wheel-side tire inflation pressure reduction judging reference value Pfref.

On the other hand, the explanation is made about the case (the case where outer-side tire inflation pressure is lowered) where the tire inflation pressure Por of the rear wheel at the outer side of the turning direction is less than the rear-wheel-side tire inflation pressure reduction judging reference value Prref. The braking force exerted on the front wheel at the outer side of the turning direction is set such that, compared to the front-wheel-side reference braking force under roll-over preventing control Ff2, a control starting value under roll-over preventing control with respect to the absolute value of the lateral acceleration Gy is set to be smaller than the control starting reference value under roll-over preventing control a2 by an early control starting volume under roll-over preventing control αsr that is determined so as to increase according to the decreasing amount of the tire inflation pressure Por of the rear wheel at the outer side of the turning direction from the rear-wheel-side tire inflation pressure reduction judging reference value Prref, and the upper limit value is set so as to be greater than the front-wheel-side reference upper limit value ff by a front-wheel-side replenishment volume under roll-over preventing control βfur that is determined so as to increases according to the decreasing amount of the tire inflation pressure Por of the rear wheel at the outer side of the turning direction from the rear-wheel-side tire inflation pressure reduction judging reference value Prref.

Further, the braking force exerted on the rear wheel at the outer side of the turning direction is set such that, compared to the rear-wheel-side reference braking force under roll-over preventing control Fr2, a control starting value under roll-over preventing control with respect to the absolute value of the lateral acceleration Gy is set to be smaller than the control starting reference value under roll-over preventing control a2 by the early control starting volume under roll-over preventing control αsr, and the upper limit value is set so as to be smaller than the rear-wheel-side reference upper limit value fr by a rear-wheel-side limiting volume under roll-over preventing control βrdr that is determined so as to increases according to the decreasing amount of the tire inflation pressure Por of the rear wheel at the outer side of the turning direction from the rear-wheel-side tire inflation pressure reduction judging reference value Prref. The front-wheel-side replenishment volume under roll-over preventing control βfur is set here so as to be always greater than the rear-wheel-side limiting volume under roll-over preventing control βrdr regardless of the decreasing amount of the tire inflation pressure Por of the rear wheel at the outer side of the turning direction from the rear-wheel-side tire inflation pressure reduction judging reference value Prref.

In case where the roll-over preventing control and OS restraining control are simultaneously executed, i.e., in case where the absolute value of the actual lateral acceleration Gy is not less than the control starting value under roll-over preventing control and the lateral acceleration deviation ΔGy is a negative value and its absolute value is not less than the control starting value under OS restraining control, the braking force exerted on the front and rear wheels at the outer side of the turning direction is set to be the greater one of the braking force determined based upon the roll-over preventing control and the braking force determined based upon the OS restraining control.

As described above, in the roll-over preventing control too, like the OS restraining control, when outer-side tire inflation pressure is lowered, the total sum (the sum of the FR braking force and the RR braking force in FIG. 3) exerted on the wheels at the outer side of the turning direction is set so as to be greater than that of when outer-side tire inflation pressure is appropriate, according to the decrease in the tire inflation pressure of the wheel whose tire inflation pressure is lowered, and the upper limit value of the braking force exerted on the tire of the wheel whose tire inflation pressure is lowered is set so as to be decreased according to the decrease in the tire inflation pressure of the wheel whose tire inflation pressure is lowered, and further, the degree of the deterioration of the stability of the vehicle (predetermined degree, absolute value of the lateral acceleration Gy, the control starting value under roll-over preventing control) at the time of starting the roll-over preventing control is set so as to be decreased according to the decrease in the tire inflation pressure of the wheel whose tire inflation pressure is lowered.

As described above, this device executes the US restraining control, OS restraining control and roll-over preventing control (hereinafter generically referred to as "stability control upon turning") to thereby exert predetermined braking force on each wheel for ensuring stability of the vehicle. Further, when any one of anti-skid control, front-rear braking force distribution control and traction control described later is also required to be executed upon executing the stability control upon turning, this device finally determines the braking force that should be exerted on each wheel by considering also the braking force that should be exerted on each wheel for executing any one of the above-mentioned controls. The above description is about the outline of the vehicle motion control.

(Actual Operation)

Subsequently, the actual operation of the vehicle motion control device 10 of the present invention and having the above-mentioned construction will be explained hereinbelow with reference to FIGS. 4 to 6, FIG. 10, FIGS. 14 to 16 showing routines with flowcharts executed by the CPU 61 of the electrical control apparatus 60 and FIGS. 7 to 9 and FIGS. 11 to 13 showing various tables used upon executing these various routines with graphs. The symbol "" marked at the end of the various variables, flags, symbols or the like is a comprehensive expression of "fl", "fr" or the like marked at the end of the various variables, flags or symbols for showing which wheel such as FR or the like is related to the various variables, flags, symbols or the like. For example, the wheel speed Vw comprehensively represents the front-left wheel speed Vwfl, front-right wheel speed Vwfr, rear-left wheel speed Vwrl and rear-right wheel speed Vwrr.

Figure 4:
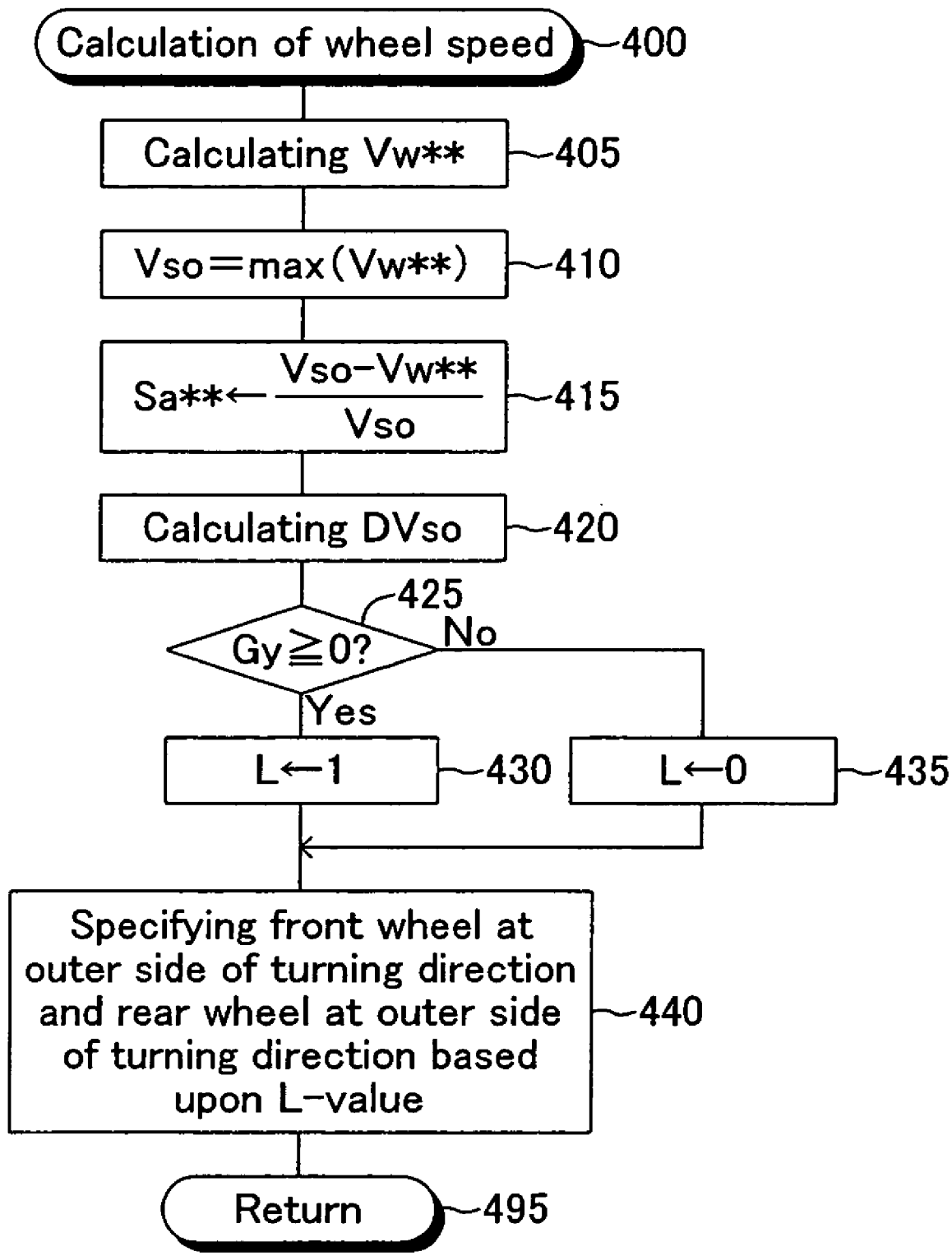

The CPU 61 repeatedly executes a routine shown in FIG. 4 for calculating the wheel speed Vw or the like once every predetermined period. Accordingly, the CPU 61 starts the process from a step 400 at a predetermined timing, and then proceeds to a step 405 to respectively calculate the wheel speed (outer peripheral speed of each wheel) Vw of each wheel FR or the like. Specifically, the CPU 61 calculates the respective wheel speeds Vw of each wheel FR or the like based upon a time interval of a pulse possessed by a signal outputted from each wheel speed sensor 51.

Then, the CPU 61 moves to a step 410 to calculate the maximum value among the wheel speeds Vw of each wheel FR as the estimated body speed Vso. It is to be noted that the average value of the wheel speeds Vw of each wheel FR or the like may be calculated as the estimated body speed Vso.

Then, the CPU 61 moves to a step 415 to calculate an actual slip ratio Sa of every wheel based upon the estimated body speed Vso calculated at the step 410, the value of the wheel speeds Vw of each wheel FR or the like calculated at the step 405 and the formula described in the step 415. This actual slip ratio Sa** is used for calculating the braking force that should be exerted on each wheel as described later.

Then, the CPU 61 proceeds to a step 420 for calculating an estimated vehicle body acceleration DVso that is a time derivative value of the estimated body speed Vso based upon a formula (3) described later.

$$DVso=(Vso-Vso1)/\Delta t \quad (3)$$

In the formula (3), Vso1 is the previous estimated body speed calculated at the step 410 at the time of the previous execution of this routine, while $\Delta t$ is the above-mentioned predetermined time that is the operation period of this routine.

Subsequently, the CPU 61 moves to a step 425 to determine whether the value of the actual lateral acceleration Gy obtained from the lateral acceleration sensor 54 is not less than "0" or not. If the value of the actual lateral acceleration Gy is not less than "0", the CPU 61 makes "YES" determination at the step 425, and then, moves to a step 430 to set a turning direction indicating flag L to "1". Further, if the value of the actual lateral acceleration Gy is a negative value, the CPU 61 makes "NO" determination at the step 425, and then, proceeds to a step 435 to set the turning direction indicating flag L to "0".

The turning direction indicating flag L represents here that the vehicle turns in the leftward direction or rightward direction. When the value thereof is "1", it indicates that the vehicle turns in the leftward direction, while it indicates that the vehicle turns in the rightward direction when the value thereof is "0". Accordingly, the turning direction of the vehicle is specified by the value of the turning direction indicating flag L.

Then, the CPU 61 moves to a step 440 to specify which wheels correspond to the front wheel at the outer side of the turning direction and the rear wheel at the outer side of the turning direction among each of the wheels FR or the like based upon the value of the flag L set as described above. Specifically, when the value of the flag L is "1", the vehicle is turning in the leftward direction, so that it specifies that the wheel FR is the front wheel at the outer side of the turning direction and the wheel RR is the rear wheel at the outer side of the turning direction. When the value of the flag L is "0", the vehicle is turning in the rightward direction, so that it specifies that the wheel FL is the front wheel at the outer side of the turning direction and the wheel RL is the rear wheel at the outer side of the turning direction. Then, the CPU 61 moves to a step 495 to temporarily terminate this routine.

Subsequently explained is the calculation of the lateral acceleration deviation. The CPU 61 repeatedly executes a routine shown in FIG. 5 once every predetermined period. Accordingly, the CPU 61 starts the process from a step 500 at a predetermined timing, and then proceeds to a step 505 to calculate the target lateral acceleration Gyt based upon the value of the steering angle θs obtained by the steering angle sensor 52, the value of the estimated body speed Vso calculated at the step 410 in FIG. 4 and the formula described in the step 505 and corresponding to the right side of the formula (1).

Then, the CPU 61 proceeds to a step 510 to calculate the lateral acceleration deviation ΔGy based upon the value of the target lateral acceleration Gyt calculated at the step 505, the value of the actual lateral acceleration Gy obtained by the lateral acceleration sensor 54 and the formula described in the step 510 and corresponding to the right side of the formula (2). Then, the CPU 61 proceeds to a step 595 to temporarily terminate this routine.

Subsequently explained is the calculation of a control variable under OS-US restraining control that is set according to the magnitude of the yawing moment that should be caused on the vehicle by the OS-US restraining control. The CPU 61 repeatedly executes a routine shown in FIG. 6 once every predetermined period. Accordingly, the CPU 61 starts the process from a step 600 at a predetermined timing, and then proceeds to a step 605 to determine whether the value of the lateral acceleration deviation ΔGy is a negative value or not.

The explanation is continued assuming that the value of the lateral acceleration deviation ΔGy is a negative value (actually, assuming that the value of the lateral acceleration deviation ΔGy is a negative value and its absolute value is not less than the control starting value under OS restraining control). The CPU 61 judges that the vehicle is in the oversteer state as explained above, whereby it moves to a step 610 and the following for calculating the front-wheel-side control variable under OS restraining control Gfo and a rear-wheel-side control variable under OS restraining control Gro upon executing the OS restraining control.

Moving to the step 610, the CPU 61 judges whether or not the tire inflation pressure Pof that is specified at the step 440 in FIG. 4 among each tire inflation pressure P obtained from each tire inflation pressure sensor 56** and corresponds at present to the front wheel at the outer side of the turning direction is not less than the front-wheel-side tire inflation pressure reduction judging reference value Pfref. If the tire inflation pressure Pof of the front wheel at the outer side of the turning direction is not less than the front-wheel-side tire inflation pressure reduction judging reference value Pfref, the CPU 61 makes "YES" determination at the step 610, and then, proceeds to a step 615** to judge whether the tire inflation pressure Por of the rear wheel at the outer side of the turning direction is not less than the rear-wheel-side tire inflation pressure reduction judging reference value Prref or not.

The explanation is continued here assuming that the tire inflation pressure Pof of the front wheel at the outer side of the turning direction is not less than the front-wheel-side tire inflation pressure reduction judging reference value Pfref and the tire inflation pressure Por of the rear wheel at the outer side of the turning direction is not less than the rear-wheel-side tire inflation pressure reduction judging reference value Prref (i.e., outer-side tire inflation pressure is appropriate). The CPU 61 makes "YES" determination at the steps 610 and 615, and then, moves to a step 620 to obtain the front-wheel-side control variable under OS restraining control Gfo based upon the absolute value of the lateral acceleration deviation ΔGy calculated at the step 510 in FIG. 5 and a table shown by a solid line in FIG. 7A as well as to obtain the rear-wheel-side control variable under OS restraining control Gro based upon the absolute value of the lateral acceleration deviation ΔGy and a table shown by a solid line in FIG. 7B. Thereafter, the CPU 61 moves to a step 655.

Figure 7A:
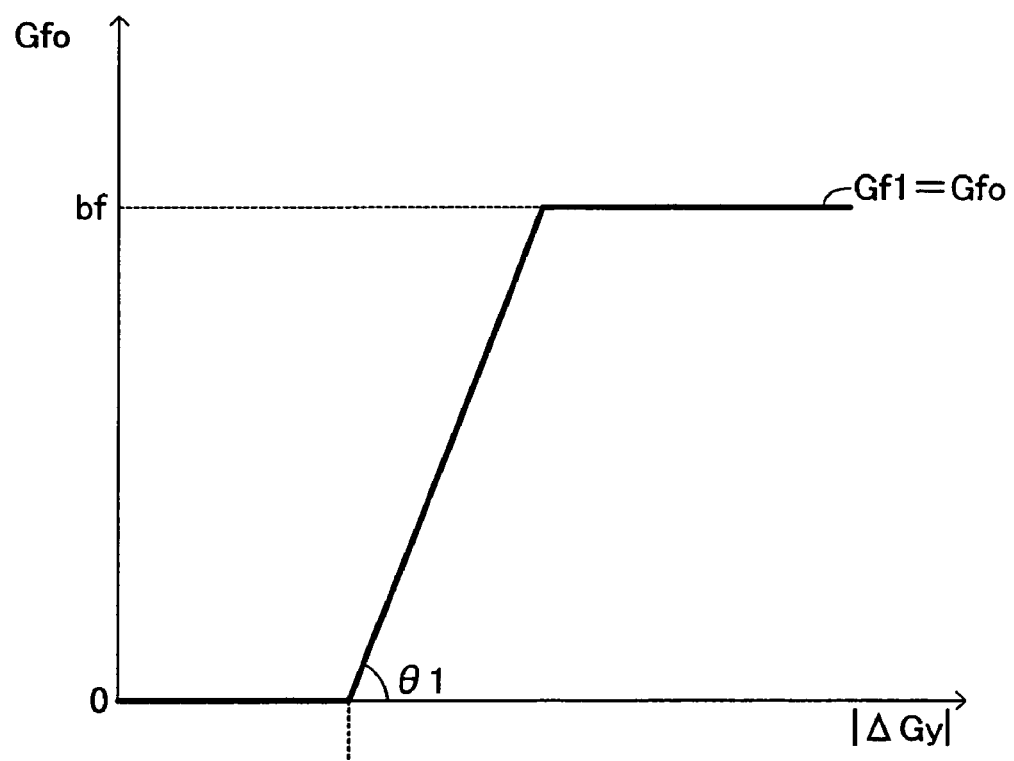
FIG. 7A is a graph used when outer-side tire inflation pressure is lowered and showing a relationship between an absolute value of a lateral acceleration deviation $\Delta Gy$ and front-wheel-side control variable under OS restraining control Gfo.

As shown in FIG. 7A, the front-wheel-side control variable under OS restraining control Gfo is the same as the front-wheel-side reference control variable under OS restraining control Gf1. This front-wheel-side reference control variable under OS restraining control Gf1 becomes "0" when the absolute value of the lateral acceleration deviation ΔGy is not more than the control starting reference value under OS restraining control a1, while, when the absolute value of the lateral acceleration deviation ΔGy exceeds the value a1, it increases from "0" with a predetermined slope θ1 until it reaches a front-wheel-side reference upper limit value bf, as the absolute value of the lateral acceleration deviation ΔGy increases from the value a1. After the front-wheel-side reference control variable under OS restraining control Gf1 reaches the front-wheel-side reference upper limit value bf, it is set so as to keep the front-wheel-side reference upper limit value bf even if the absolute value of the lateral acceleration deviation ΔGy increases.

Figure 7B:
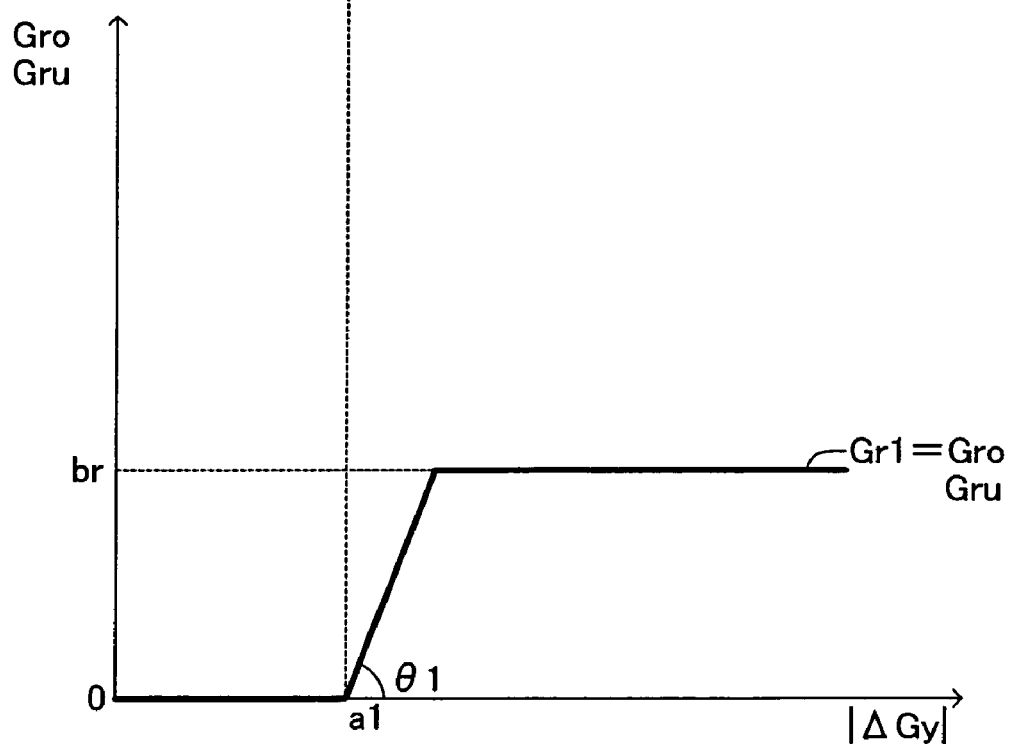
FIG. 7B is a graph used when outer-side tire inflation pressure is appropriate and showing a relationship between the absolute value of the lateral acceleration deviation $\Delta Gy$ and rear-wheel-side control variable under OS restraining control Gro and rear-wheel-side control variable under US restraining control Gru.

Further, as shown in FIG. 7B, the rear-wheel-side control variable under OS restraining control Gro is the same as the rear-wheel-side reference control variable under OS restraining control Gr1. This rear-wheel-side reference control variable under OS restraining control Gr1 becomes "0" when the absolute value of the lateral acceleration deviation ΔGy is not more than the control starting reference value under OS restraining control a1, while, when the absolute value of the lateral acceleration deviation ΔGy exceeds the value a1, it increases from "0" with a predetermined slope θ1 until it reaches a rear-wheel-side reference upper limit value br, as the absolute value of the lateral acceleration deviation ΔGy increases from the value a1. After the rear-wheel-side reference control variable under OS restraining control Gr1 reaches the rear-wheel-side reference upper limit value br, it is set so as to keep the rear-wheel-side reference upper limit value br even if the absolute value of the lateral acceleration deviation ΔGy increases.

Subsequently, the explanation is continued assuming that the tire inflation pressure Pof of the front wheel at the outer side of the turning direction is less than the front-wheel-side tire inflation pressure reduction judging reference value Pfref (i.e., assuming that outer-side tire inflation pressure is lowered). The CPU 61 makes "NO" determination at the step 610 regardless of whether the tire inflation pressure Por of the rear wheel at the outer side of the turning direction is not less than the rear-wheel-side tire inflation pressure reduction judging reference value Prref or not. Then, the CPU 61 moves to a step 625 to calculate the front-wheel-side limiting volume under OS restraining control αfdo and the rear-wheel-side replenishment volume under OS restraining control αruo based upon the value obtained by subtracting the tire inflation pressure Pof of the front wheel at the outer side of the turning direction from the front-wheel-side tire inflation pressure reduction judging reference value Pfref and the table described in the step 625.

This allows to increase the front-wheel-side limiting volume under OS restraining control αfdo and the rear-wheel-side replenishment volume under OS restraining control αruo according to the increase in the value obtained by subtracting the tire inflation pressure Pof of the front wheel at the outer side of the turning direction from the front-wheel-side tire inflation pressure reduction judging reference value Pfref and further, this allows to set the rear-wheel-side replenishment volume under OS restraining control αruo so as to be always greater than the front-wheel-side limiting volume under OS restraining control αfdo.

Then, the CPU 61 moves to a step 630 to calculate the early control starting volume under OS restraining control αso previously explained based upon the value obtained by subtracting the tire inflation pressure Pof of the front wheel at the outer side of the turning direction from the front-wheel-side tire inflation pressure reduction judging reference value Pfref and the table described in the step 630. This allows to set the early control starting volume under OS restraining control αso so as to increase according to the increase in the value obtained by subtracting the tire inflation pressure Pof of the front wheel at the outer side of the turning direction from the front-wheel-side tire inflation pressure reduction judging reference value Pfref.

Figure 8A:
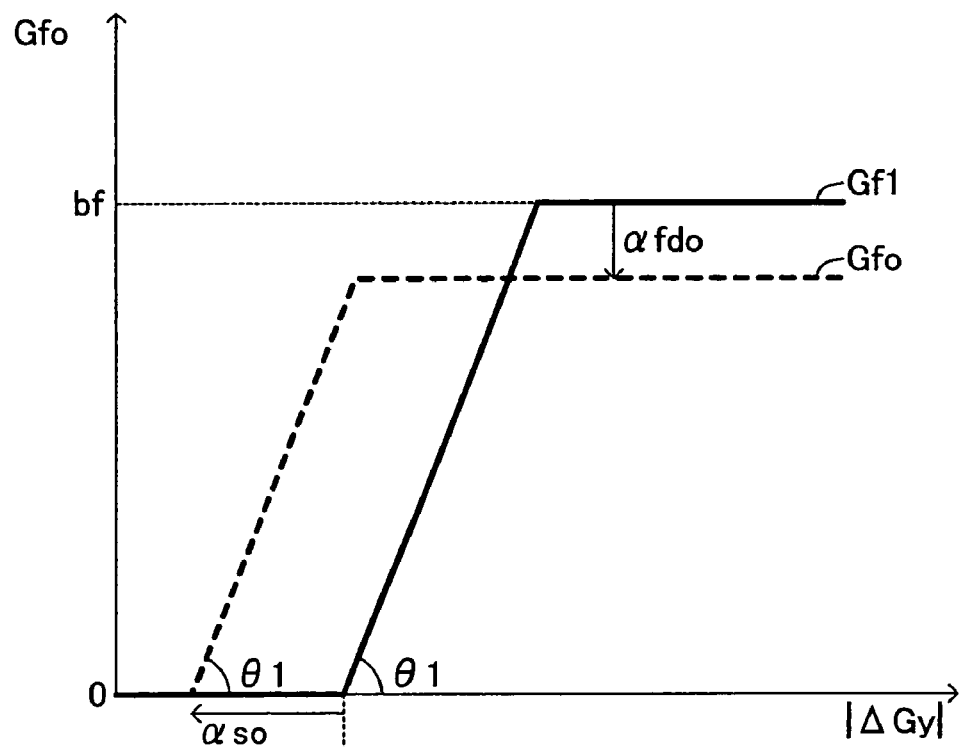
FIG. 8A is a graph used when a front wheel at the outer side of a turning direction is a wheel whose tire inflation pressure is lowered and showing a relationship between an absolute value of a lateral acceleration deviation $\Delta Gy$ and front-wheel-side control variable under OS restraining control Gfo.
Figure 8B:
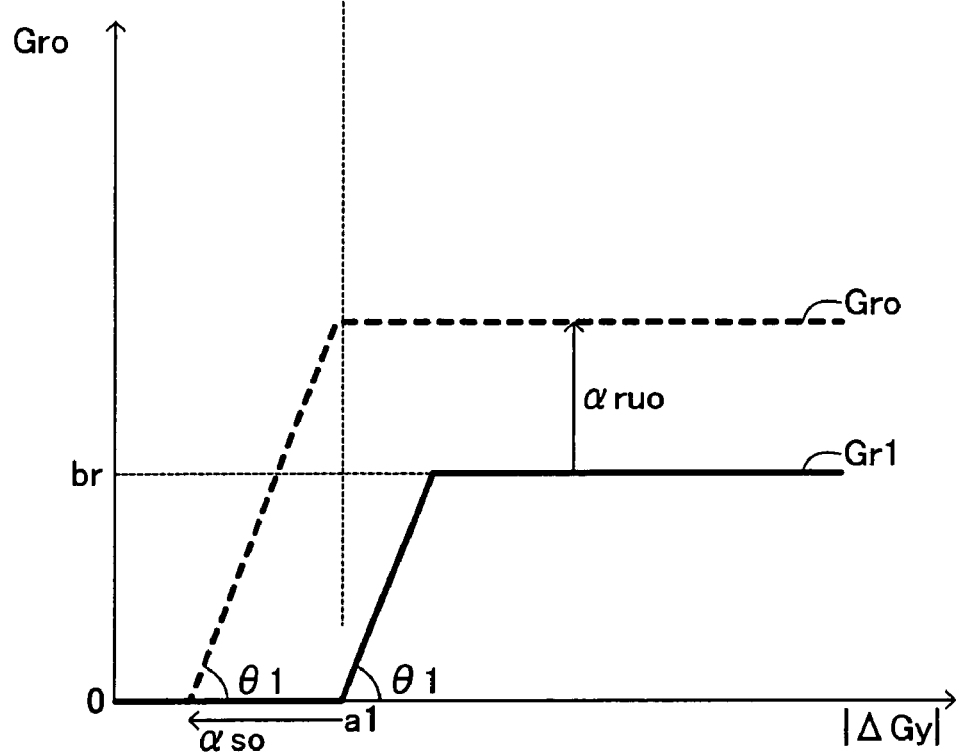
FIG. 8B is a graph used when a front wheel at the outer side of a turning direction is a wheel whose tire inflation pressure is lowered and showing a relationship between the absolute value of the lateral acceleration deviation ΔGy and rear-wheel-side control variable under OS restraining control Gro.

Subsequently, the CPU 61 moves to a step 635 to obtain the front-wheel-side control variable under OS restraining control Gfo based upon the absolute value of the lateral acceleration deviation ΔGy calculated at the step 510 in FIG. 5, the front-wheel-side limiting volume under OS restraining control αfdo calculated at the step 625, the early control starting volume under OS restraining control αso calculated at the step 630 and a table shown by a broken line in FIG. 8A, as well as to obtain the rear-wheel-side control variable under OS restraining control Gro based upon the absolute value of the lateral acceleration deviation ΔGy, the rear-wheel-side replenishment volume under OS restraining control αruo calculated at the step 625, the early control starting volume under OS restraining control αso and a table shown by a broken line in FIG. 8B. Thereafter, the CPU 61 moves to a step 655.

Subsequently, the explanation is continued here assuming that the tire inflation pressure Pof of the front wheel at the outer side of the turning direction is not less than the front-wheel-side tire inflation pressure reduction judging reference value Pfref and the tire inflation pressure Por of the rear wheel at the outer side of the turning direction is less than the rear-wheel-side tire inflation pressure reduction judging reference value Prref (i.e., outer-side tire inflation pressure is lowered). The CPU 61 makes "YES" determination at the step 610, and then, moves to the step 615 to make "NO" determination to thereby move to a step 640 for calculating the front-wheel-side replenishment volume under OS restraining control αfuo and the rear-wheel-side limiting volume under OS restraining control αrdo based upon the value obtained by subtracting the tire inflation pressure Por of the rear wheel at the outer side of the turning direction from the rear-wheel-side tire inflation pressure reduction judging reference value Prref and the table described in the step 640.

This allows to increase the front-wheel-side replenishment volume under OS restraining control αfuo and the rear-wheel-side limiting volume under OS restraining control αrdo according to the increase in the value obtained by subtracting the tire inflation pressure Por of the rear wheel at the outer side of the turning direction from the rear-wheel-side tire inflation pressure reduction judging reference value Prref and to set the front-wheel-side replenishment volume under OS restraining control αfuo so as to be always greater than the rear-wheel-side limiting volume under OS restraining control αrdo.

Then, the CPU 61 moves to a step 645 to calculate the early control starting volume under OS restraining control αso previously explained based upon the value obtained by subtracting the tire inflation pressure Por of the rear wheel at the outer side of the turning direction from the rear-wheel-side tire inflation pressure reduction judging reference value Prref and the table described in the step 645. This allows to set the early control starting volume under OS restraining control αso so as to increase according to the increase in the value obtained by subtracting the tire inflation pressure Por of the rear wheel at the outer side of the turning direction from the rear-wheel-side tire inflation pressure reduction judging reference value Prref.

Figure 9A:
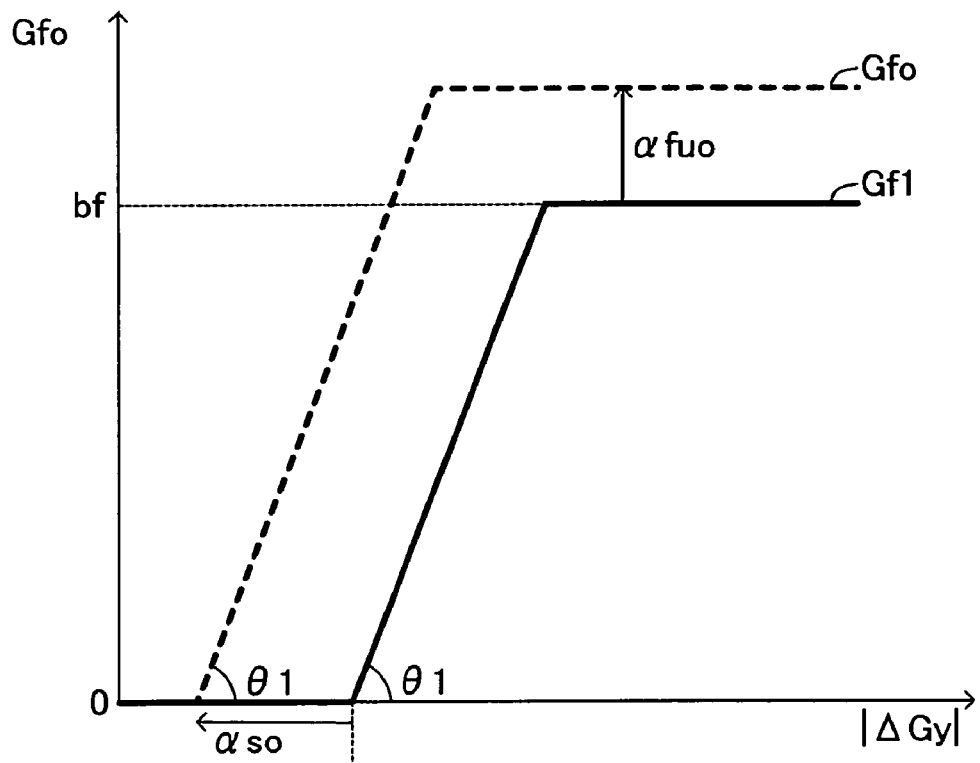
FIG. 9A is a graph used when only a rear wheel at the outer side of a turning direction is a wheel whose tire inflation pressure is lowered and showing a relationship between an absolute value of a lateral acceleration deviation ΔGy and front-wheel-side control variable under OS restraining control Gfo.
Figure 9B:
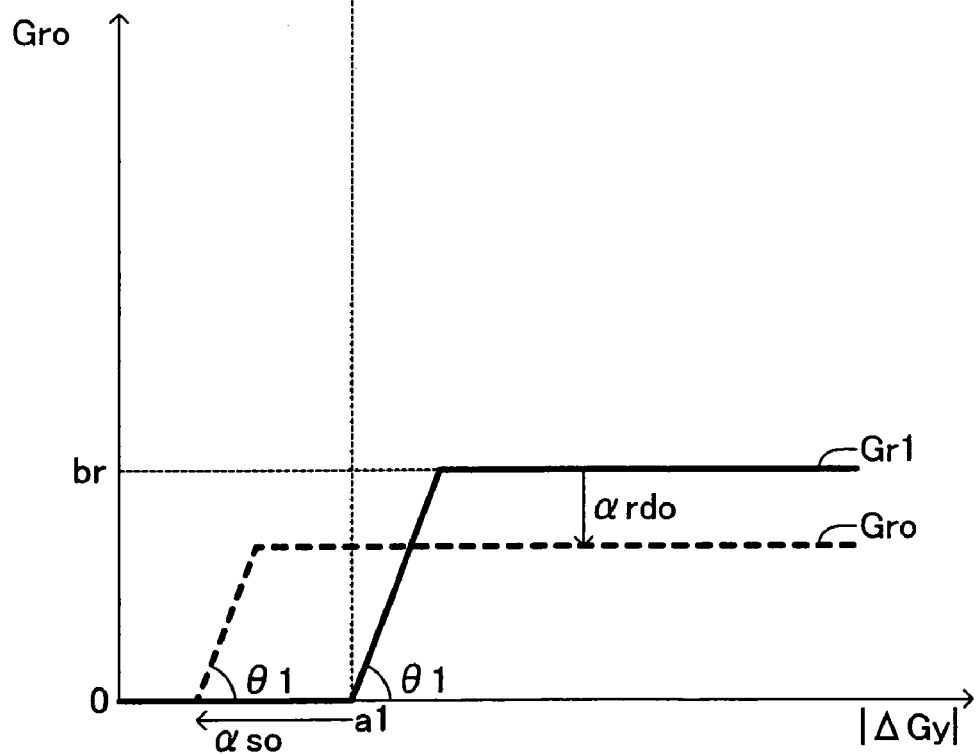
FIG. 9B is a graph used when only a rear wheel at the outer side of a turning direction is a wheel whose tire inflation pressure is lowered and showing a relationship between the absolute value of the lateral acceleration deviation ΔGy and rear-wheel-side control variable under OS restraining control Gro.

Subsequently, the CPU 61 moves to a step 650 to obtain the front-wheel-side control variable under OS restraining control Gfo based upon the absolute value of the lateral acceleration deviation ΔGy calculated at the step 510 in FIG. 5, the front-wheel-side replenishment volume under OS restraining control αfuo calculated at the step 640, the early control starting volume under OS restraining control αso calculated at the step 645 and a table shown by a broken line in FIG. 9A, as well as to obtain the rear-wheel-side control variable under OS restraining control Gro based upon the absolute value of the lateral acceleration deviation ΔGy, the rear-wheel-side limiting volume under OS restraining control αrdo calculated at the step 640, the early control starting volume under OS restraining control αso and a table shown by a broken line in FIG. 9B. Thereafter, the CPU 61 moves to the step 655.

Figure 5:
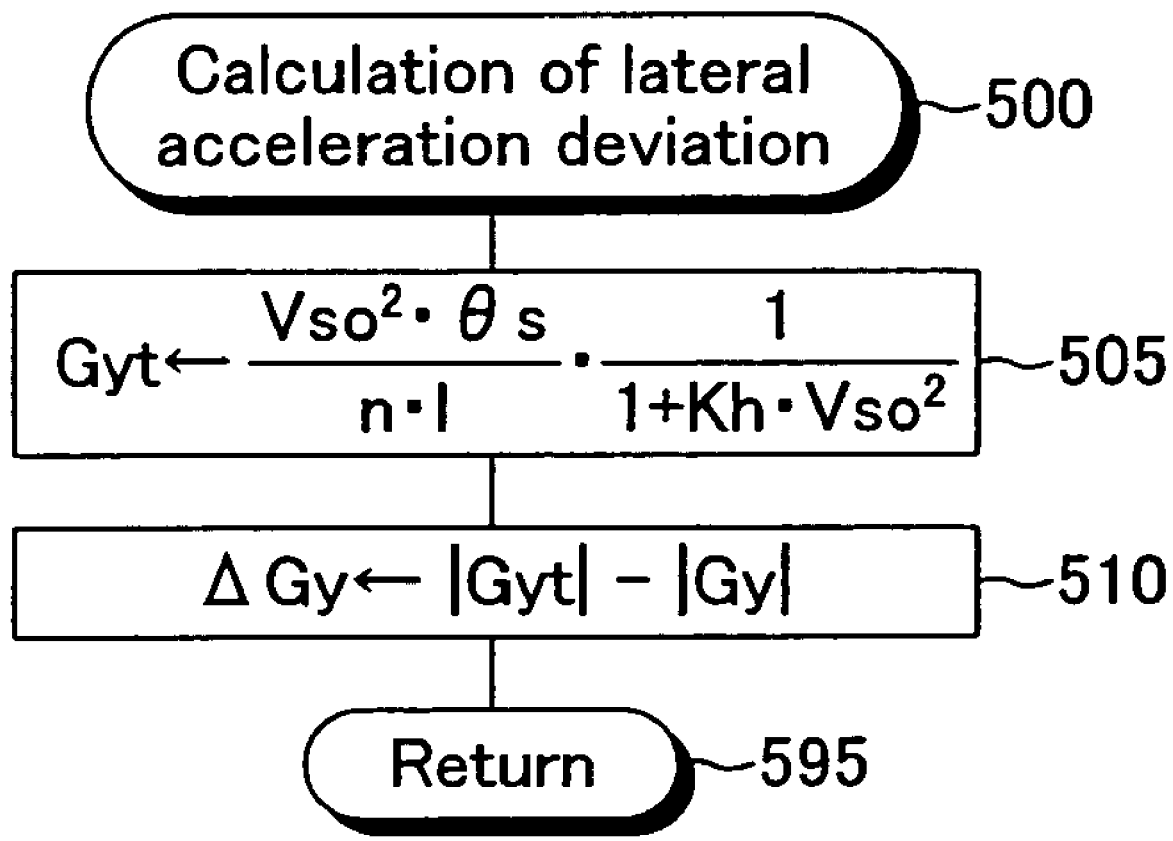
FIG. 5 is a flowchart showing a routine executed by the CPU shown in FIG. 1 for calculating a lateral acceleration deviation.

After calculating the front-wheel-side control variable under OS restraining control Gfo and the rear-wheel-side control variable under OS restraining control Gro as described above, the CPU 61 proceeds to the step 655 to obtain a rear-wheel-side control variable under US restraining control Gru (=rear-wheel-side control variable under OS restraining control Gro) for executing the US restraining control based upon the absolute value of the lateral acceleration deviation ΔGy calculated at the step 510 in FIG. 5 and the table shown by the solid line in FIG. 7B. Thereafter, the CPU 61 proceeds to a step 695 to temporarily terminate this routine.

Further, the explanation is continued assuming that the value of the lateral acceleration deviation ΔGy is not less than "0" (actually, the value of the lateral acceleration ΔGy is not less than the control starting value under US restraining control (the control starting reference value under OS restraining control a1) in the judgement at the step 605. The CPU 61 makes "NO" determination at the step 605 to determine that the vehicle is in the understeer state as previously explained, thereby moving directly to the step 655 without calculating the above-mentioned front-wheel-side control variable under OS restraining control Gfo and the rear-wheel-side control variable under OS restraining control Gro, wherein only the rear-wheel-side control variable under US restraining control Gru is obtained. Thereafter, the CPU 61 proceeds to the step 695 to temporarily terminate this routine. As described above, the front-wheel-side control variable under OS restraining control Gfo, the rear-wheel-side control variable under OS restraining control Gro and the rear-wheel-side control variable under US restraining control Gru are calculated.

Figure 11A:
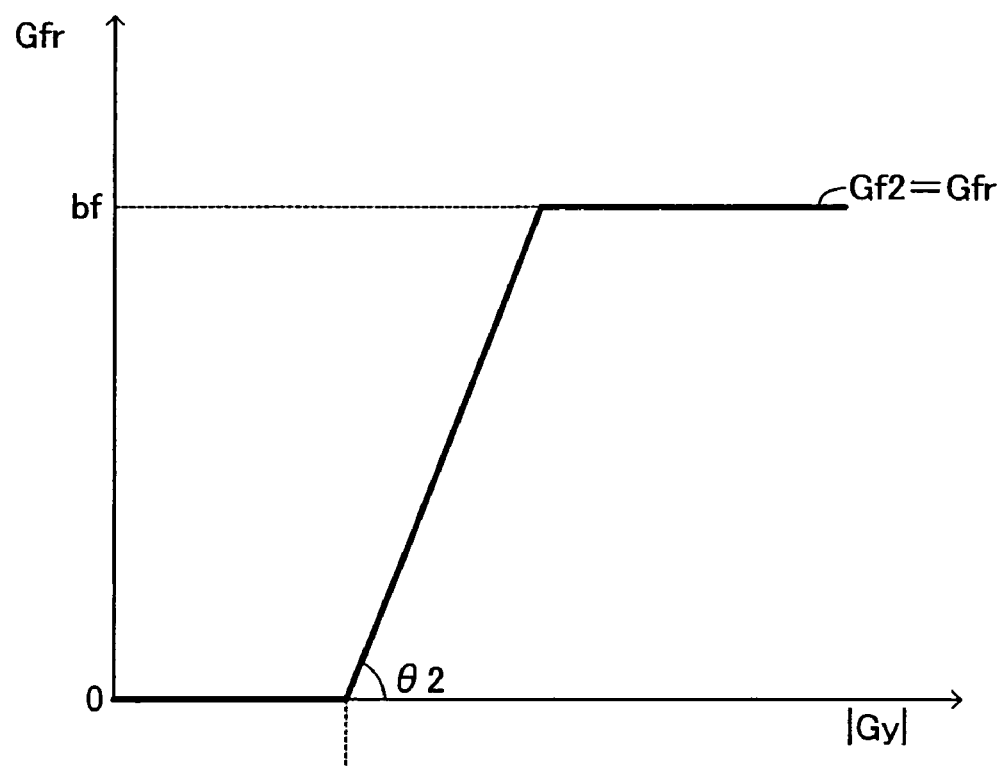
FIG. 11A is a graph used when outer-side tire inflation pressure is appropriate and showing a relationship between an absolute value of a lateral acceleration deviation ΔGy and front-wheel-side control variable under roll-over preventing control Gfr.
Figure 11B:
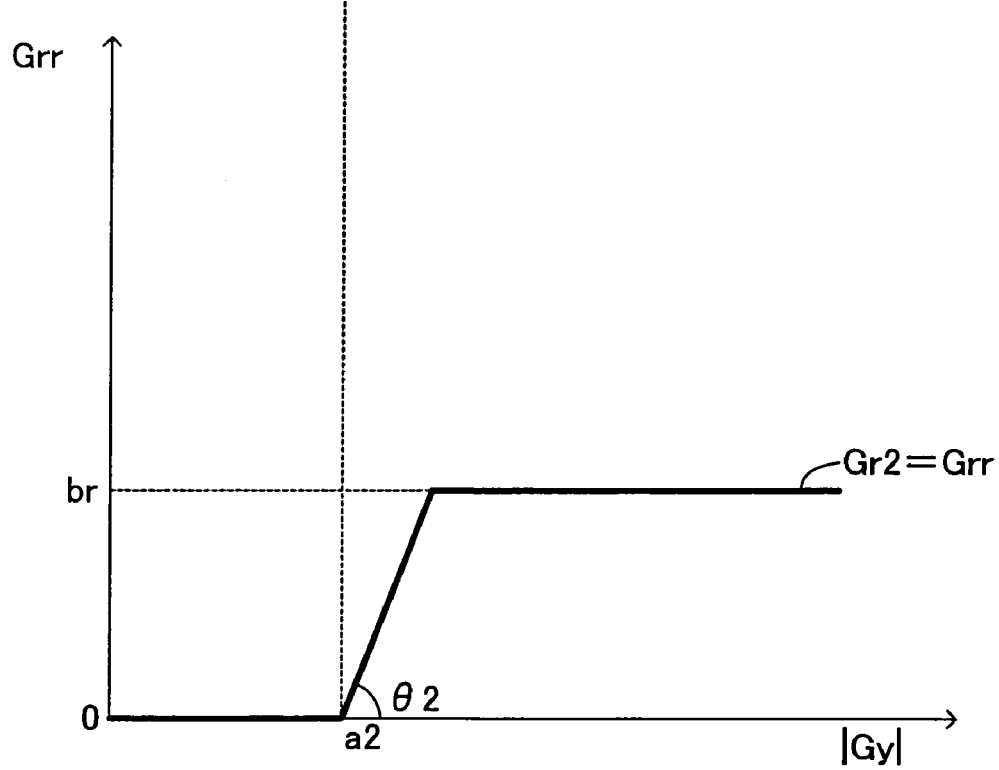
FIG. 11B is a graph used when outer-side tire inflation pressure is appropriate and showing a relationship between the absolute value of the lateral acceleration deviation ΔGy and rear-wheel-side control variable under roll-over preventing control Grr.
Figure 12A:
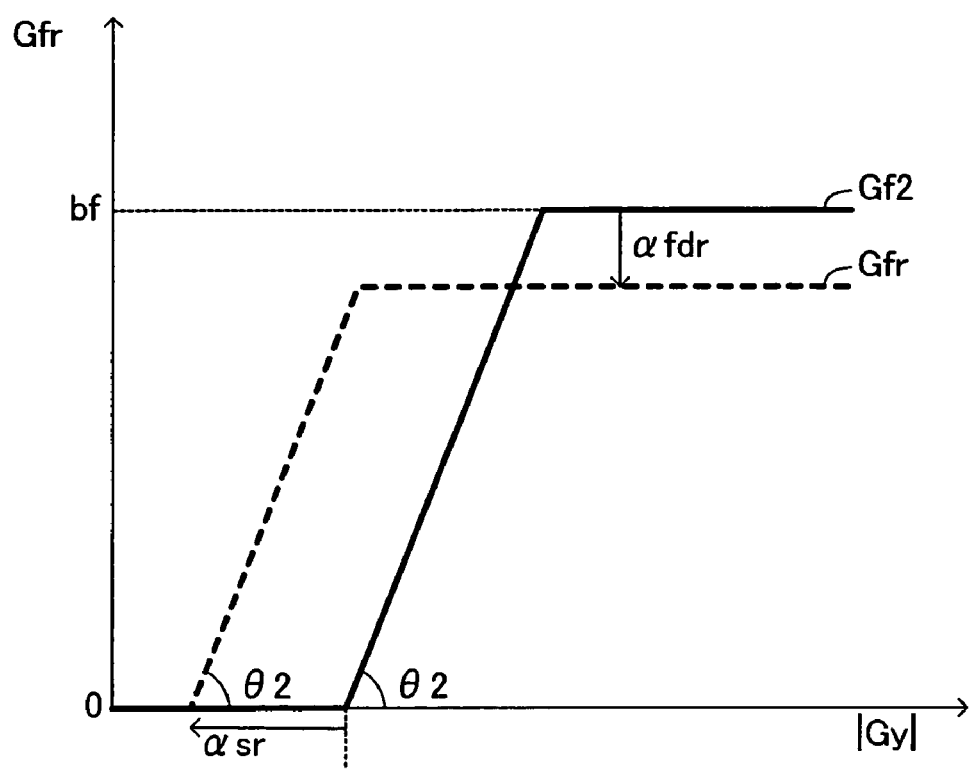
FIG. 12A is a graph used when a front wheel at the outer side of a turning direction is a wheel whose tire inflation pressure is lowered and showing a relationship between an absolute value of a lateral acceleration deviation ΔGy and front-wheel-side control variable under roll-over preventing control Gfr.
Figure 12B:
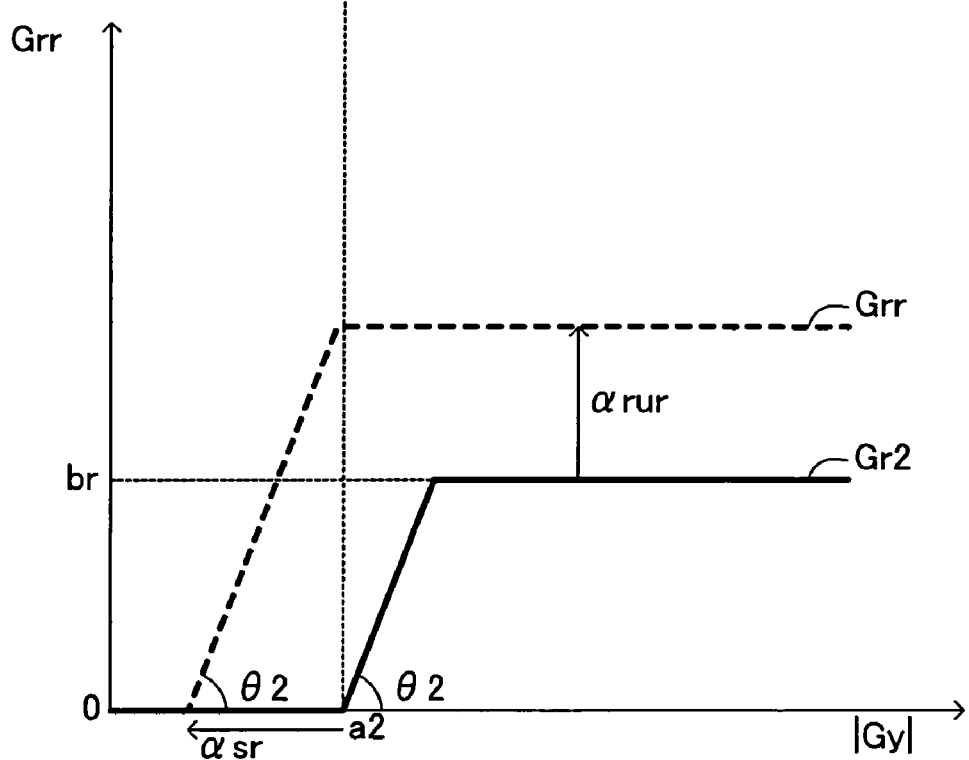
FIG. 12B is a graph used when a front wheel at the outer side of a turning direction is a wheel whose tire inflation pressure is lowered and showing a relationship between the absolute value of the lateral acceleration deviation ΔGy and rear-wheel-side control variable under roll-over preventing control Grr.
Figure 13A:
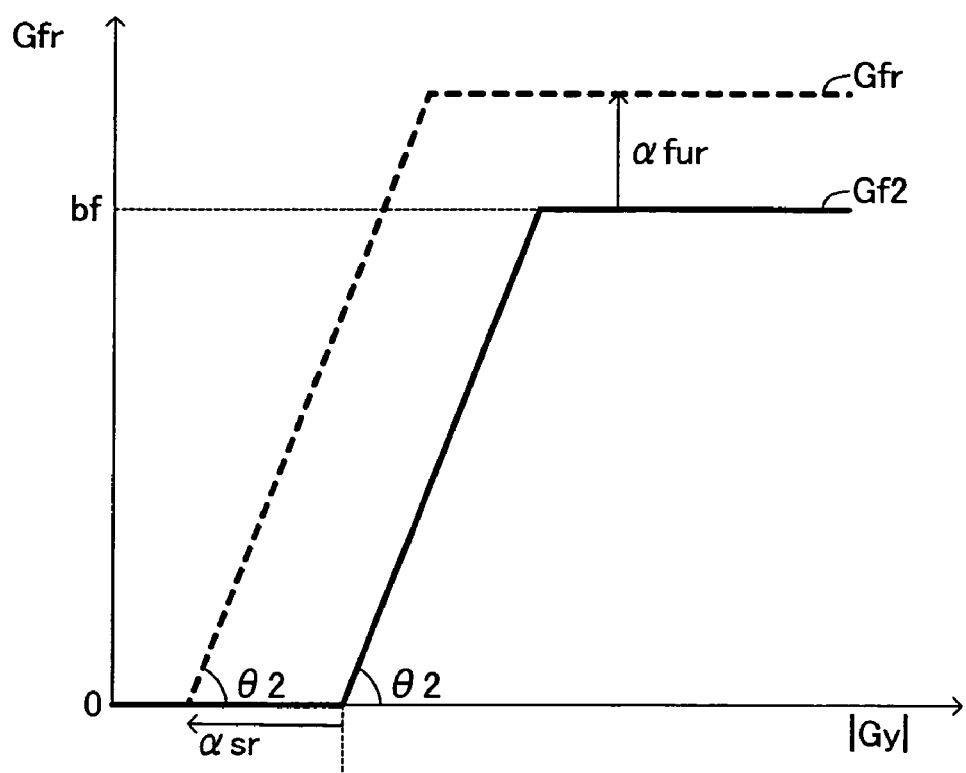
FIG. 13A is a graph used when only a rear wheel at the outer side of a turning direction is a wheel whose tire inflation pressure is lowered and showing a relationship between an absolute value of a lateral acceleration deviation ΔGy and front-wheel-side control variable under roll-over preventing control Gfr.
Figure 13B:
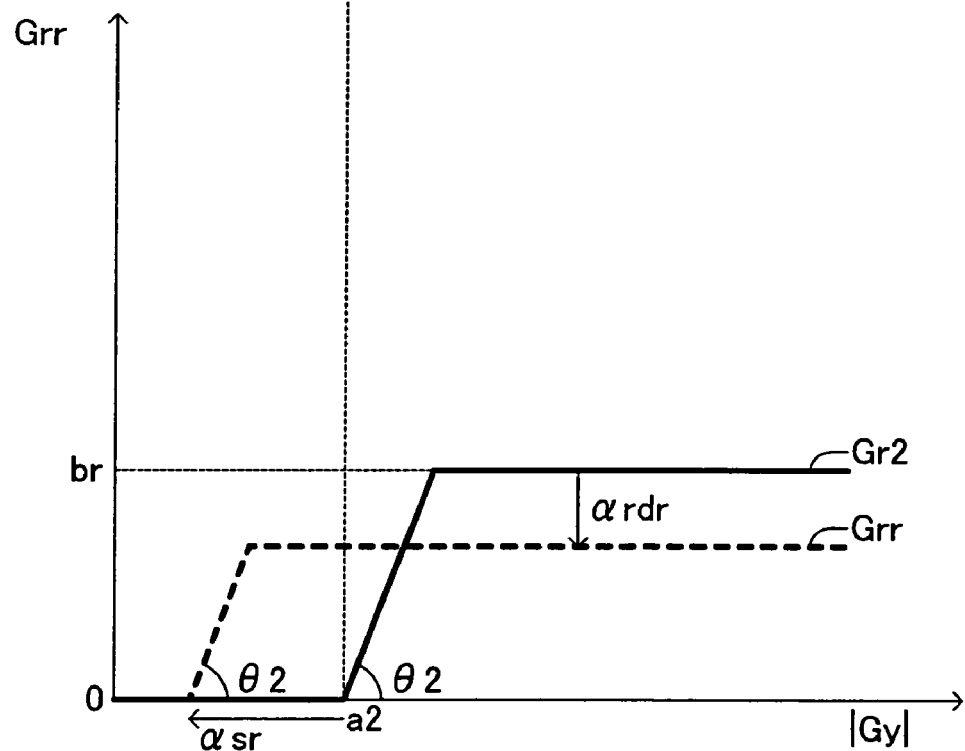
FIG. 13B is a graph used when only a rear wheel at the outer side of a turning direction is a wheel whose tire inflation pressure is lowered and showing a relationship between the absolute value of the lateral acceleration deviation ΔGy and rear-wheel-side control variable under roll-over preventing control Grr.

Subsequently explained is the calculation of a control variable under roll-over preventing control that is set according to the magnitude of the yawing moment that should be caused on the vehicle with the roll-over preventing control. The CPU 61 repeatedly executes a routine shown in FIG. 10 once every predetermined period. The routine that executes a processing by using each table shown in FIGS. 11 to 13 is the same as the routine shown in FIG. 6, so that the detailed explanation of this processing is omitted here. By this routine, the front-wheel-side control variable under roll-over preventing control Gfr and the rear-wheel-side control variable under roll-over preventing control Grr are calculated. Like the routine in FIG. 6, when the value of the lateral acceleration deviation ΔGy is not less than "0", the CPU 61 makes "NO" determination at a step 1005 and directly moves to a step 1095 without calculating the front-wheel-side control variable under roll-over preventing control Gfr and the rear-wheel-side control variable under roll-over preventing control Grr, thereby temporarily terminating this routine.

Subsequently explained is the calculation of the target slip ratio of each wheel required to determine the braking force that should be exerted on each wheel upon executing only the above-mentioned stability control upon turning. The CPU 61 repeatedly executes a routine shown in FIG. 14 once every predetermined period. Accordingly, the CPU 61 starts the process from a step 1400 at a predetermined timing, and then proceeds to a step 1405 to determine whether the value of the lateral acceleration deviation ΔGy calculated at the step 510 in FIG. 5 is not less than "0" or not. In case where the value of the lateral acceleration deviation ΔGy is not less than "0" (actually, in case where the value of the lateral acceleration deviation ΔGy is not less than the control starting value under US restraining control (the control starting reference value under OS restraining control a1)), the CPU 61 judges that the vehicle is in the understeer state as previously explained, so that it moves to a step 1410 for calculating the target slip ratio of each wheel upon executing the US restraining control to thereby judge whether the value of the turning direction indicating flag L is "1" or not.

Figure 6:
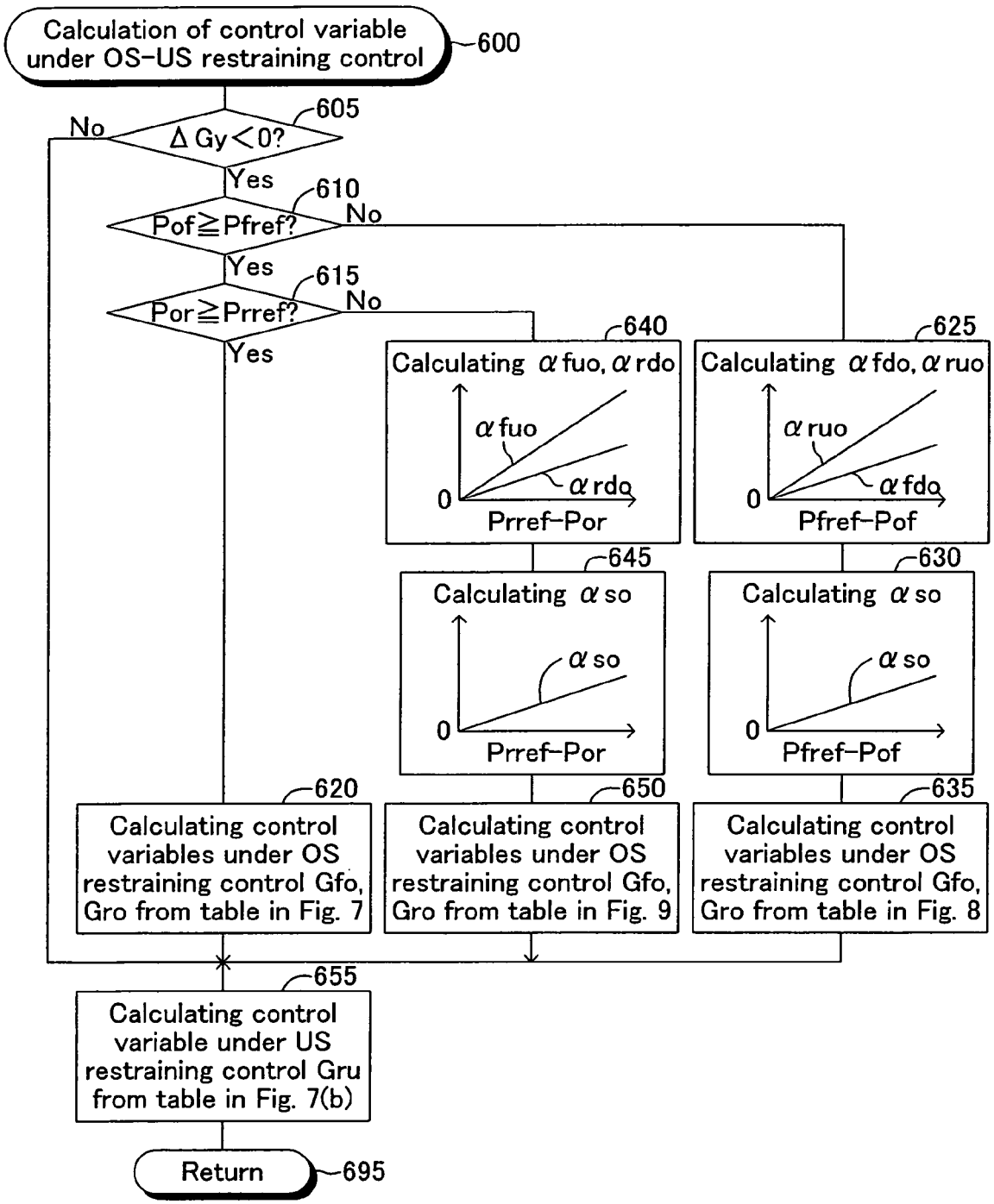
FIG. 6 is a flowchart showing a routine executed by the CPU shown in FIG. 1 for calculating control variable under OS-US restraining control.

When the turning direction indicating flag L is "1" in the judgement of the step 1410, the CPU 61 proceeds to a step 1415 to set a value obtained by multiplying together a coefficient K that is a constant and the rear-wheel-side control variable under US restraining control Gru calculated at the step 655 in FIG. 6 as the target slip ratio Strr of the rear-left wheel RL as well as set all the target slip ratios Stfl, Stfr and Strr of the other wheels FL, FR and RR to "0". Then, the CPU 61 proceeds to a step 1495 to temporarily terminate this routine. This process allows to set the target slip ratio, corresponding to the absolute value of the lateral acceleration deviation ΔGy for causing the yawing moment in the direction same as the turning direction, to only the rear-left wheel RL corresponding to the inside rear wheel in the turning direction in case where the vehicle turns in the leftward direction.

On the other hand, when the turning direction indicating flag L is "0" in the judgement of the step 1410, the CPU 61 proceeds to a step 1420 to set a value obtained by multiplying together the coefficient K and the rear-wheel-side control variable under US restraining control Gru calculated at the step 655 in FIG. 6 as the target slip ratio Strr of the rear-right wheel RR as well as set all the target slip ratios Stfl, Stfr and Strl of the other wheels FL, FR and RL to "0". Then, the CPU 61 proceeds to the step 1495 to temporarily terminate this routine. This process allows to set the target slip ratio, corresponding to the absolute value of the lateral acceleration deviation ΔGy for causing the yawing moment in the direction same as the turning direction, to only the rear-right wheel RR corresponding to the inside rear wheel in the turning direction in case where the vehicle turns in the rightward direction.

Figure 10:
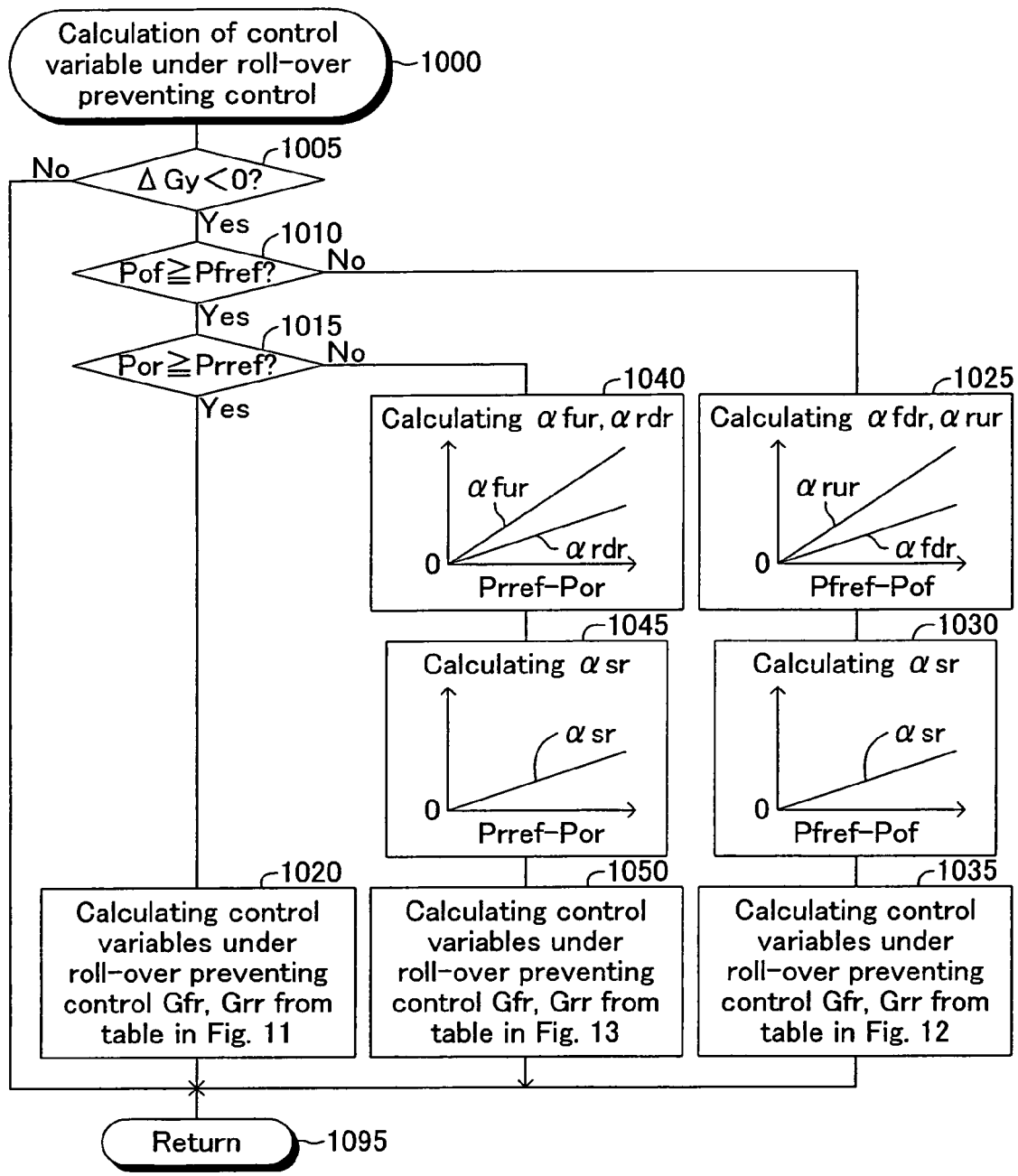
FIG. 10 is a flowchart showing a routine executed by the CPU shown in FIG. 1 for calculating control variable under roll-over preventing control.

On the other hand, when the value of the lateral acceleration deviation ΔGy is a negative value in the judgement at the step 1405 (actually when the value of the lateral acceleration deviation ΔGy is a negative value and its absolute value is not less than the control starting reference value under OS restraining control a1), the CPU 61 judges that the vehicle is in the oversteer state as previously explained, whereby it moves to a step 1425 for calculating the target slip ratio of each wheel upon executing the oversteer restraining control, thereby calculating, as the front-wheel-side control variable Gf, the greater value of the front-wheel-side control variable under OS restraining control Gfo calculated in any one of steps 620, 635 and 650 in FIG. 6 and the front-wheel-side control variable under roll-over preventing control Gfr calculated in any one of steps 1020, 1035 and 1050 in FIG. 10, as well as calculating, as the rear-wheel-side control variable Gr, the greater value of the rear-wheel-side control variable under OS restraining control Gro calculated in any one of steps 620, 635 and 650 in FIG. 6 and the rear-wheel-side control variable under roll-over preventing control Grr calculated in any one of steps 1020, 1035 and 1050 in FIG. 10. Subsequently, the CPU 61 moves to a step 1430 to determine whether the value of the turning direction indicating flag L is "1" or not. When the turning direction indicating flag L is "1" in the judgement of the step 1430, the CPU 61 proceeds to a step 1435 to set a value obtained by multiplying together the coefficient K and the value of the front-wheel-side control variable Gf calculated at the step 1425 as the target slip ratio Stfr of the front-right wheel FR, set a value obtained by multiplying together the coefficient K and the value of the rear-wheel-side control variable Gr calculated at the step 1425 as the target slip ratio Strr of the rear-right wheel RR and set the target slip ratios Stfl and Strl of the other wheels FL and RL to "0". Then, the CPU 61 proceeds to the step 1495 to temporarily terminate this routine. This process allows to set the target slip ratio, corresponding to either one of the absolute value of the lateral acceleration deviation ΔGy and the absolute value of the lateral acceleration Gy for causing the yawing moment in the direction opposite to the turning direction, to only the front-right wheel FR and the rear-right wheel RR corresponding to the outside front and rear wheels in the turning direction in case where the vehicle turns in the leftward direction.

On the other hand, when the turning direction indicating flag L is "0" in the judgement of the step 1430, the CPU 61 proceeds to a step 1440 to set a value obtained by multiplying together the coefficient K and the value of the front-wheel-side control variable Gf calculated at the step 1425 as the target slip ratio Stfl of the front-left wheel FL, set a value obtained by multiplying together the coefficient K and the value of the rear-wheel-side control variable Gr calculated at the step 1425 as the target slip ratio Strl of the rear-left wheel RL and set the target slip ratios Stfr and Strr of the other wheels FR and RR to "0". Then, the CPU 61 proceeds to the step 1495 to temporarily terminate this routine. This process allows to set the target slip ratio, corresponding to either one of the absolute value of the lateral acceleration deviation ΔGy and the absolute value of the lateral acceleration Gy for causing the yawing moment in the direction opposite to the turning direction, to only the front-left wheel FL and the rear-left wheel RL corresponding to the outside front and rear wheels in the turning direction in case where the vehicle turns in the rightward direction. As described above, the target slip ratio of each wheel required to determine the braking force that should be exerted on each wheel upon executing only the stability control upon turning is determined.

Subsequently explained is a setting of a control mode of the vehicle. The CPU 61 repeatedly executes a routine shown in FIG. 15 once every predetermined period. Accordingly, the CPU 61 starts the process from a step 1500 at a predetermined timing, and then proceeds to a step 1505 to determine whether the anti-skid control is necessary or not at the present. The anti-skid control is a control, when a specific wheel is locked with the brake pedal BP operated, for decreasing the braking force of the specific wheel. The detail of the anti-skid control is well-known, so that the detailed explanation thereof is omitted here.

Specifically, at the step 1505, the CPU 61 judges that the anti-skid control is necessary in case where the state that the brake pedal BP is operated is shown by the brake switch 55 and the value of the actual slip ratio Sa of the specific wheel calculated at the step 415 in FIG. 4** is not less than the positive predetermined value.

When the anti-skid control is judged to be necessary at the judgement of the step 1505, the CPU 61 moves to a step 1510 to set "1" to a variable Mode for setting a control mode that simultaneously executes the stability control upon turning and the anti-skid control, and then, proceeds to the following step 1550.

On the other hand, when the anti-skid control is judged to be unnecessary at the judgement of the step 1505, the CPU 61 moves to a step 1515 to determine whether the front-rear braking force distribution control is required or not at present. The front-rear braking force distribution control is a control for decreasing a ratio (distribution) of the braking force of rear wheels to the braking force of front wheels in accordance with a magnitude of a deceleration in the front-rear direction of the vehicle with the brake pedal BP operated. The detail of the front-rear braking force distribution control is well-known, so that the detailed explanation thereof is omitted here.

Specifically, the CPU 61 judges at the step 1515 that the front-rear braking force distribution control is needed, in case where the brake switch 55 shows that the brake pedal BP is operated and the case where the estimated body speed DVso calculated at the step 420 of FIG. 4 is a negative value and its absolute value is not less than the predetermined value.

When the front-rear braking force distribution control is needed in the judgement at the step 1515, the CPU 61 proceeds to a step 1520 where "2" is set to a variable Mode for setting a control mode for executing both the stability control upon turning and the front-rear braking force distribution control. Then, the CPU 61 proceeds to the next step 1550.

When the front-rear braking force distribution control is not needed in the judgement at the step 1515, the CPU 61 proceeds to a step 1525 for determining whether the traction control is needed or not at present. The traction control is a control for increasing the braking force of the specific wheel or decreasing the driving force of the engine 31 in case where the specific wheel is spun in the direction where the driving force of the engine 31 is generated with the brake pedal BP not operated. The detail of the traction control is well-known, so that the detailed explanation thereof is omitted here.

Specifically, the CPU 61 judges at the step 1525 that the traction control is needed, in case where the brake switch 55 shows that the brake pedal BP is not operated and the case where the actual slip ratio Sa of the specific wheel calculated at the step 415 of FIG. 4** is a negative value and its absolute value is not less than the predetermined value.

When the traction control is needed in the judgement at the step 1525, the CPU 61 proceeds to a step 1530 where "3" is set to a variable Mode for setting a control mode that executes both the stability control upon turning and the traction control. Then, the CPU 61 proceeds to the next step 1550.

When the traction control is not needed in the judgement at the step 1525, the CPU 61 proceeds to a step 1535 for determining whether the stability control upon turning is needed or not at present. Specifically, the CPU 61 determines that the stability control upon turning is needed at the step 1535 in case where there exists the specific wheel wherein the value of the target slip ratio St set by the routine in FIG. 14** is not "0".

When the stability control upon turning is needed in the judgement at the step 1535, the CPU 61 proceeds to a step 1540 where "4" is set to a variable Mode for setting a control mode executing only the stability control upon turning. Then, the CPU 61 proceeds to the next step 1550. On the other hand, when it is determined that the stability control upon turning is not needed in the judgement of the step 1535, the CPU 61 proceeds to a step 1545 where "5" is set to a variable Mode for setting a non-control mode wherein the vehicle motion control is not executed, and then, proceeds to the next step 1550. In this case, the specific wheel that should be controlled is not present.

When the CPU 61 proceeds to the step 1550, it sets "1" to a flag CONT corresponding to a wheel to be controlled, while sets "0" to a flag CONT corresponding to a wheel not to be controlled, that is not the wheel to be controlled. The wheel to be controlled at this step 1550 is a wheel that is required to control at least one of the corresponding pressure increasing valve PU and the pressure decreasing valve PD shown in FIG. 2.

Figure 14:
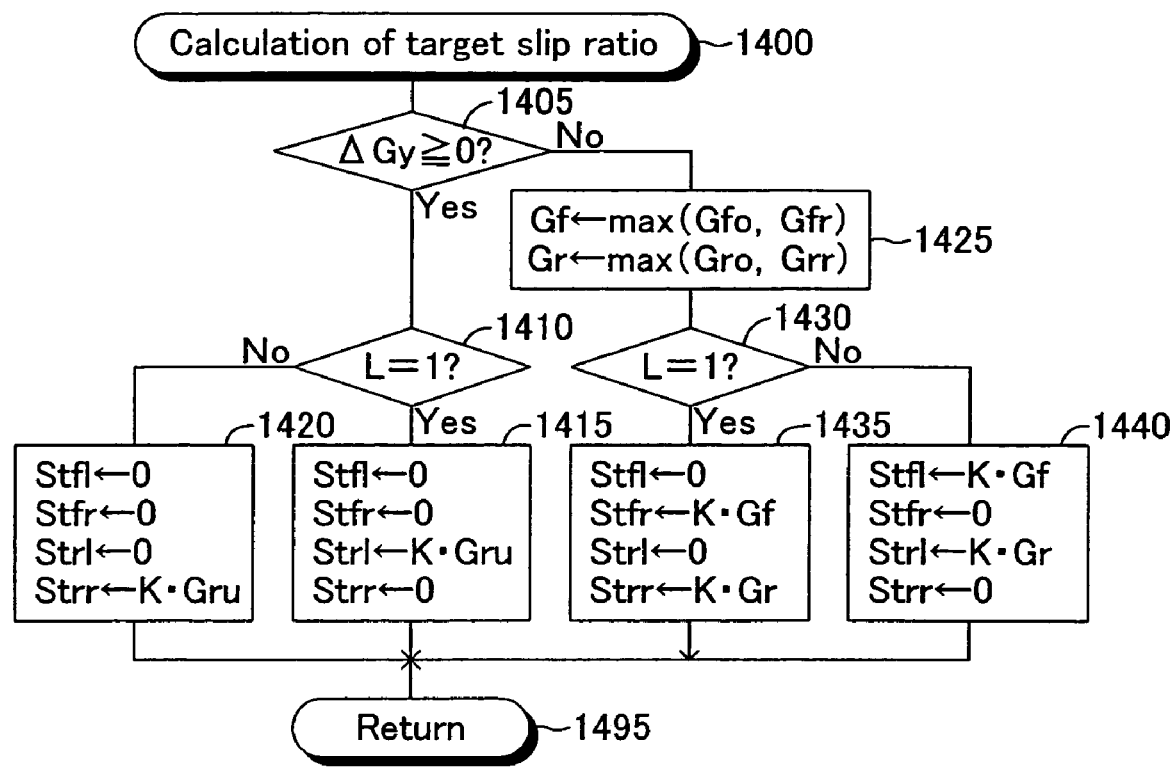
FIG. 14 is a flowchart showing a routine executed by the CPU shown in FIG. 1 for calculating a target slip ratio.

Accordingly, in case where only the brake fluid pressure in the wheel cylinder Wrr of the rear-right wheel RR is required to be increased, such as the case where the brake pedal BP is not operated and the program proceeds to the step 1420 in FIG. 14, for example, the control valve SA2, change-over valve STR and pressure increasing valve PUrl shown in FIG. 2 are switched over to the second position and the pressure increasing valve PUrr and the pressure decreasing valve PDrr are respectively controlled, whereby only the brake fluid pressure in the wheel cylinder Wrr is increased by utilizing the high pressure generated from the high-pressure generating section 41 while keeping the brake fluid pressure in the wheel cylinder Wrl to be the fluid pressure at this time. Therefore, not only the rear-right wheel RR but also the rear-left wheel RL are included in the wheels to be controlled in this case. After executing the step 1550, the CPU 61 proceeds to a step 1595 for temporarily terminating this routine. As described above, the control mode is specified and the wheel to be controlled is specified.

Subsequently explained is the control of the braking force that should be exerted on each driving wheel. The CPU 61 repeatedly executes the routine shown in FIG. 16 once every predetermined period. Accordingly, the CPU 61 starts the process from a step 1600 at a predetermined timing, and then, proceeds to a step 1605 to determine whether the variable Mode is "0" or not. If the variable Mode is "0" here, the CPU 61 makes "NO" determination at the step 1605, and then, proceeds to a step 1610 for turning off (non-actuated state) all electromagnetic solenoids in the brake hydraulic control device 40 since the brake control is not required to be executed to each wheel. Thereafter, the CPU 61 moves to a step 1695 to temporarily terminate this routine. This allows to supply to each wheel cylinder W** brake fluid pressure according to the operating force of the brake pedal BP by the driver.

On the other hand, if the variable Mode is not "0" in the judgement at the step 1605, the CPU 61 makes "Yes" determination at the step 1605, and proceeds to a step 1615 for determining whether the variable Mode is "4" or not. If the variable Mode is not "4" (i.e., if the anti-skid control or the like that is other than the stability control upon turning is needed), the CPU 61 makes "NO" determination at the step 1615, and then, proceeds to a step 1620 for correcting the target slip ratio St of each wheel that is required upon executing only the stability control upon turning already set in FIG. 14, with respect to the wheel to be controlled wherein the value of the flag CONT is set to "1" at the step 1550 in FIG. 15. Then, the CPU 61 moves to a step 1625. By this process, the target slip ratio St of each wheel already set in FIG. 14** is corrected, every wheel to be controlled, by the target slip ratio of each wheel required for executing the control that is simultaneously executed with the stability control upon turning and corresponds to the value of the variable Mode.

If the variable Mode is "4" in the judgement at the step 1615, the CPU 61 makes "YES" determination at the step 1615, and directly moves to the step 1625, since it is unnecessary to correct the target slip ratio St of each wheel already set in FIG. 14. Moving to the step 1625, the CPU 61 calculates a slip ratio deviation ΔSt every wheel to be controlled based upon the value of the target slip ratio St, the value of the actual slip ratio Sa calculated at the step 415 in FIG. 4 and the formula disclosed in the step 1625, with respect to the wheel to be controlled wherein the value of the flag CONT** is set to "1" at the step 1550 in FIG. 15.

Then, the CPU 61 proceeds to a step 1630 for setting a hydraulic control mode with respect to the wheel to be controlled every wheel to be controlled. Specifically, every wheel to be controlled, the CPU 61 sets the hydraulic control mode to "pressure-up" when the value of the slip ratio deviation ΔSt exceeds the predetermined positive reference value, sets the hydraulic control mode to "keep" when the value of the slip ratio deviation ΔSt is not less than the predetermined negative reference value but not more than the predetermined positive reference value, and sets the hydraulic control mode to "pressure-down" when the value of the slip ratio deviation ΔSt is less than the predetermined negative reference value, based upon the value of the slip ratio deviation ΔSt calculated at the step 1625 every wheel to be controlled and the table disclosed in the step 1630.

Subsequently, the CPU 61 proceeds to a step 1635 where it controls the control valves SA1 and SA2 and the changeover valve STR shown in FIG. 2 based upon the hydraulic control mode set at the step 1630 every wheel to be controlled and further it controls the pressure increasing valve PU and pressure reducing valve PD according to the hydraulic control mode every wheel to be controlled.

Specifically, the CPU 61 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep", and further it controls to set the corresponding pressure increasing valve PU and pressure reducing valve PD to the second position (position in the actuated state) with respect to the wheel to be controlled having the hydraulic control mode of "pressure-down".

This operation causes to increase the brake fluid pressure in the wheel cylinder W of the wheel to be controlled having the hydraulic control mode of "pressure-up", while to decrease the brake fluid pressure in the wheel cylinder W of the wheel to be controlled having the hydraulic control mode of "pressure-down", whereby each wheel to be controlled is controlled such that the actual slip ratio Sa of each wheel to be controlled approaches to the target slip ratio St. Consequently, the control corresponding to the control mode set in FIG. 15 can be achieved. The step 1635 corresponds to braking force controlling means.

Figure 15:
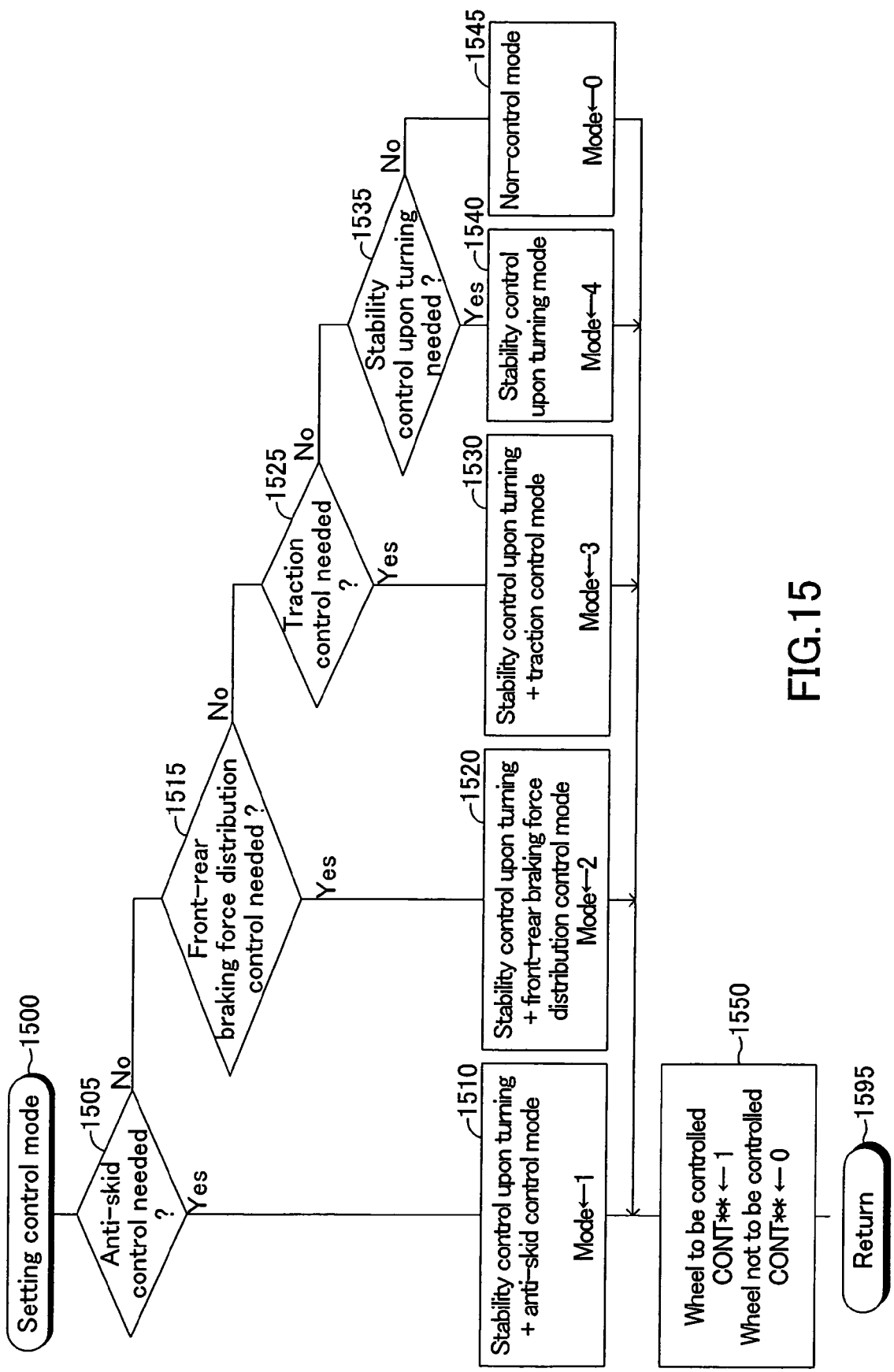
FIG. 15 is a flowchart showing a routine executed by the CPU shown in FIG. 1 for setting a control mode.
Figure 16:
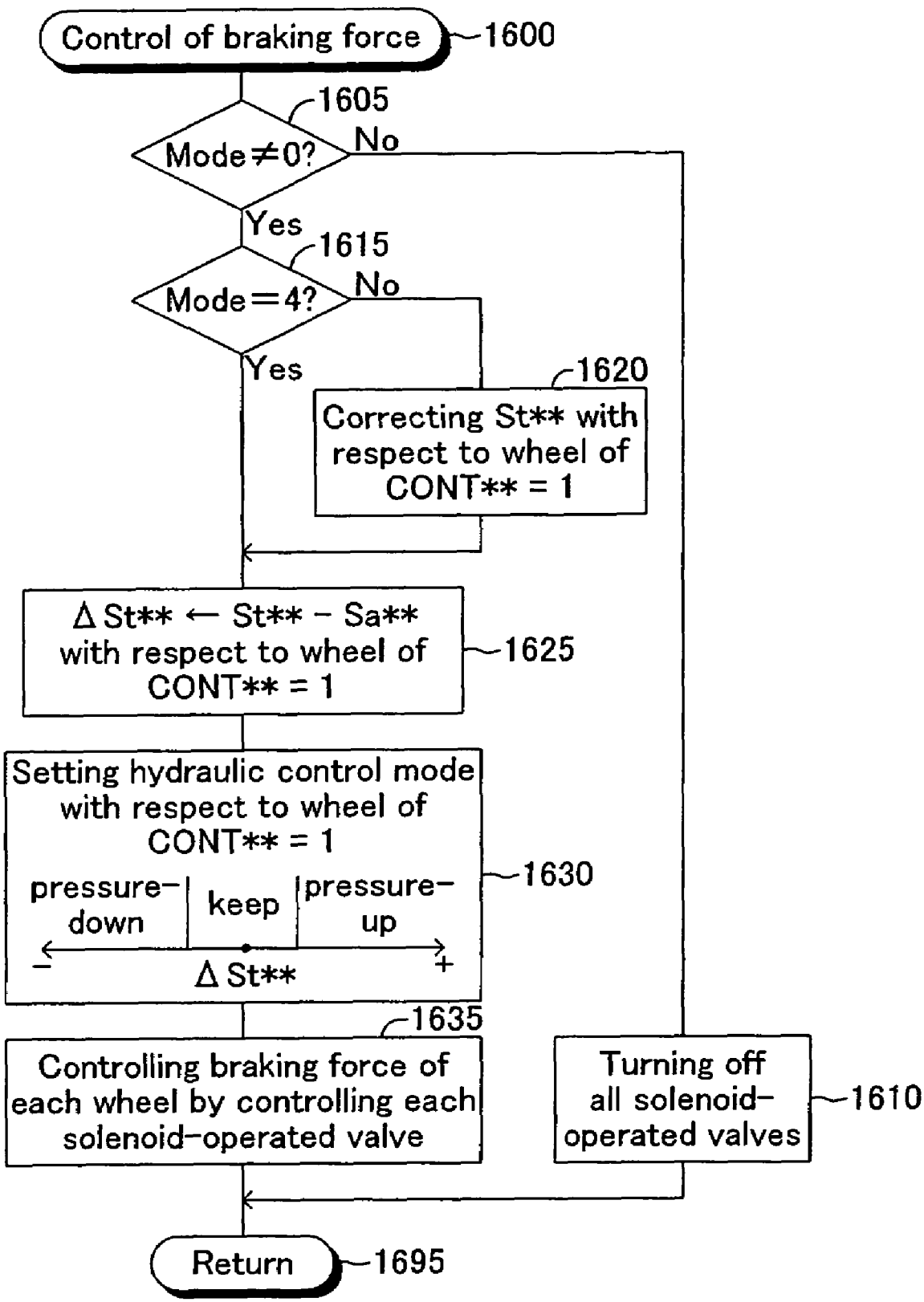
FIG. 16 is a flowchart showing a routine executed by the CPU shown in FIG. 1 for controlling braking force exerted on each wheel.

It is to be noted that, when the control mode set by the execution of the routine of FIG. 15 is the control mode (variable Mode=3) for executing the traction control mode or the control mode (variable Mode=4) for executing only the stability control upon turning, the CPU 61 controls, according to need, the throttle valve actuator 32 such that the opening of the throttle valve TH becomes smaller than the opening according to the operating amount Accp of the accelerator pedal AP by a predetermined amount for reducing driving force from the engine 31. Then, the CPU 61 proceeds to the step 1695 for temporarily terminating this routine. As explained above, according to the vehicle motion control device of the present invention, in case where the vehicle is in the turning state and braking force is exerted on each wheel with the OS restraining control or roll-over preventing control for ensuring stability of the vehicle, the yawing moment in the direction opposite to the turning direction increases as a result of exerting the braking force on each wheel when outer-side tire inflation pressure is lowered, compared to the case where outer-side tire inflation pressure is appropriate. Accordingly, when outer-side tire inflation pressure is lowered, the absolute value of the actual lateral acceleration Gy exerted on the vehicle is decreased compared to the case where outer-side tire inflation pressure is appropriate, thereby being capable of preventing the occurrence of an excessive roll angle on the vehicle.

Further, the invention is configured such that the degree of increasing the yawing moment in the direction opposite to the turning direction is increased according to the decrease of the tire inflation pressure of the wheel at the outer side of the turning direction whose inflation pressure is lowered. Therefore, a degree of preventing the increase in the roll angle is appropriately set according to a degree of increasing the tendency that an excessive roll angle occurs, based upon the reduction in the tire inflation pressure, thereby being capable of preventing the occurrence of an excessive roll angle on the vehicle body while satisfactorily keeping stability of the vehicle.

Moreover, the invention is configured such that the total sum of each braking force exerted on the wheels at the outer side of the turning direction is increased in order to increase the yawing moment in the direction opposite to the turning direction. This configuration allows to increase the total sum of the braking force exerted on each wheel when outer-side tire inflation pressure is lowered, compared to the case where outer-side tire inflation pressure is appropriate, resulting in that the decelerating force for decelerating the vehicle is also increased. Therefore, when outer-side tire inflation pressure is lowered, the occurrence of an excessive roll angle on the vehicle body can further be prevented by both an effect for reducing the actual lateral acceleration actually exerted on the vehicle due to the action of the yawing moment in the direction opposite to the turning direction and an effect for reducing the actual lateral acceleration due to the action of the decelerating force.

Further, the invention is configured such that an upper limit value of braking force exerted on the wheel whose tire inflation pressure is lowered is decreased according to the reduction in the tire inflation pressure of the wheel whose tire inflation pressure is lowered. This configuration enables to keep small a degree of the deformation of the tire of the wheel whose tire inflation pressure is lowered, and hence, the occurrence of an excessive roll angle on the vehicle body can much further be prevented by both the effect for reducing the actual lateral acceleration actually exerted on the vehicle due to the action of the yawing moment in the direction opposite to the turning direction and the effect for reducing the actual lateral acceleration due to the action of the decelerating force.

Moreover, the invention is configured such that a degree of deteriorating the stability of the vehicle upon starting to apply braking force on each wheel of the vehicle for ensuring stability of the vehicle is decreased according to the reduction in the tire inflation pressure of the wheel whose tire inflation pressure is lowered. Therefore, when the vehicle is in the turning state and during a process wherein the deterioration of the stability of the vehicle advances, this configuration enables to start to exert braking force on each wheel for producing a yawing moment in the direction opposite to the turning direction at an earlier stage according to the reduction in the tire inflation pressure of the wheel whose tire inflation pressure is lowered when outer-side tire inflation pressure is lowered, compared to the case where outer-side tire inflation pressure is appropriate. Accordingly, when outer-side tire inflation pressure is lowered, the yawing moment in the direction opposite to the turning direction can smoothly be increased according to the reduction in the tire inflation pressure of the wheel whose tire inflation pressure is lowered, compared to the case where outer-side tire inflation pressure is appropriate.

The present invention is not limited to the above-mentioned embodiments. Various modifications can be applied within the scope of the present invention. For example, although the slip ratio of each wheel is used as a controlled target for controlling the braking force exerted on each wheel of the vehicle in the above-mentioned embodiment, any physical volume such as brake fluid pressure in the wheel cylinder W** of each wheel may be used as a controlled target, so long as it is physical volume that changes according to the braking force exerted on each wheel.

What is claimed is:

1. A vehicle motion control device, comprising:
   inflation pressure obtaining means for respectively obtaining a tire inflation pressure of each wheel of a vehicle;
   braking force controlling means for exerting on each wheel braking force for producing a yawing moment on the vehicle in a direction opposite to a turning direction when the vehicle is in a turning state and an excessive rolling angle tends to occur on the vehicle body,
   the braking force controlling means controlling the braking force exerted on each wheel in accordance with a degree of a tendency for the excessive rolling angle to occur in a case where all of the tire inflation pressures of the wheels at the outer side of the turning direction are not less than each of corresponding tire inflation pressure reduction judging reference values, and
   the braking force controlling means controlling the braking force exerted on each wheel in a case where at least one of the tire inflation pressures of the wheels at the outer side of the turning direction is lower than the corresponding tire inflation pressure reduction judging reference value such that the yawing moment, produced by the braking force controlling means, in the direction opposite to the turning direction is greater than that in the case where all of the tire inflation pressures of the wheels at the outer side of the turning direction are not less than each of the corresponding tire inflation pressure reduction judging reference values.

2. A vehicle motion control device claimed in claim 1, wherein the braking force controlling means is configured to increase a degree of increasing the yawing moment in the direction opposite to the turning direction according to the reduction in the at least one of the tire inflation pressures of the wheel wheels at the outer side of the turning direction.

3. A vehicle motion control device claimed in claim 1, wherein the braking force controlling means is configured to increase the total sum of each braking force exerted on the wheels at the outer side of the turning direction in order to increase the yawing moment in the direction opposite to the turning direction.

4. A vehicle motion control device claimed in claim 3, wherein the braking force controlling means is configured to respectively set an upper limit value of the braking force exerted on each wheel and to decrease the upper limit value of the braking force exerted on at least one wheel according to the reduction in the tire inflation pressure of the at least one wheel.

5. A vehicle motion control device claimed in claim 1, wherein the braking force controlling means is configured to start to exert on each wheel of the vehicle braking force for producing the yawing moment on the vehicle in the direction opposite to the turning direction when the vehicle is in the turning state and a degree of the tendency for the excessive rolling angle to occur on the vehicle body exceeds a predetermined degree, as well as to decrease the predetermined degree according to the reduction in the at least one of the tire inflation pressures of the wheels at the outer side of the turning direction.

* * * * *